United States Patent [19]

Brown et al.

[11] Patent Number: 5,942,461

[45] Date of Patent: Aug. 24, 1999

[54] POLYMERIZABLE COMPOSITIONS COMPRISING ALPHA-OLEFIN HYDROCARBON MONOMERS AND METHODS OF USE THEREFOR

[75] Inventors: Katherine A. Brown, Lake Elmo; Edward G. Stewart, White Bear Lake; Penelope J. Swanson, Minneapolis; William M. Lamanna, Stillwater; Allen R. Siedle, Lake Elmo, all of Minn.

[73] Assignee: Minnesota Mining and Manufacturing Company, St. Paul, Minn.

[21] Appl. No.: 08/637,727

[22] PCT Filed: Apr. 15, 1996

[86] PCT No.: PCT/US96/05227

§ 371 Date: Apr. 15, 1996

§ 102(e) Date: Apr. 15, 1996

[87] PCT Pub. No.: WO97/17380

PCT Pub. Date: May 15, 1997

Related U.S. Application Data

[63] Continuation-in-part of application No. 08/591,449, Nov. 6, 1995, abandoned.

[51] Int. Cl.[6] ........................................ B01J 31/00
[52] U.S. Cl. ..................... 502/154; 502/152; 502/155; 526/93; 526/94; 526/120; 526/134; 526/171; 526/348.2; 526/348.3; 526/348.6; 526/351; 556/7; 556/13; 556/34
[58] Field of Search .......................... 526/93, 94, 120, 526/134, 171; 556/34, 7, 13; 502/152, 154, 155; 524/323

[56] References Cited

U.S. PATENT DOCUMENTS

| | | | |
|---|---|---|---|
| 3,691,140 | 9/1972 | Silver | 260/78.5 |
| 4,166,152 | 8/1979 | Baker et al. | 428/522 |
| 4,429,079 | 1/1984 | Shibata et al. | 525/240 |
| 4,724,273 | 2/1988 | Fink et al. | 585/511 |
| 5,030,606 | 7/1991 | Klabunde | 502/155 |
| 5,045,577 | 9/1991 | Mülhaupt et al. | 524/99 |
| 5,053,436 | 10/1991 | Delgado | 521/64 |
| 5,055,438 | 10/1991 | Canich | 502/117 |
| 5,064,802 | 11/1991 | Stevens et al. | 502/155 |
| 5,157,164 | 10/1992 | Olivier | 568/719 |
| 5,198,511 | 3/1993 | Brown-Wensley et al. | 526/113 |
| 5,204,429 | 4/1993 | Kaminsky | 526/308 |
| 5,296,566 | 3/1994 | Brown-Wensley et al. | 526/171 |
| 5,412,046 | 5/1995 | Yano et al. | 526/171 |
| 5,443,765 | 8/1995 | Yoshimura et al. | 264/22 |
| 5,468,819 | 11/1995 | Goodall et al. | 526/171 |
| 5,480,952 | 1/1996 | Marks | 526/308 |
| 5,491,206 | 2/1996 | Brown-Wensley et al. | 526/126 |
| 5,516,739 | 5/1996 | Barborak | 502/161 |
| 5,521,263 | 5/1996 | Seeger et al. | 526/68 |

FOREIGN PATENT DOCUMENTS

| | | |
|---|---|---|
| 0 371 635 | 6/1990 | European Pat. Off. . |
| 454231 | 10/1991 | European Pat. Off. . |
| 0 504 418 | 9/1992 | European Pat. Off. . |
| 569032A3 | 11/1993 | European Pat. Off. . |
| 0 610 601 A1 | 8/1994 | European Pat. Off. . |
| 9623010 | 8/1996 | European Pat. Off. . |
| 29 23 206 A1 | 11/1980 | Germany ............. C08F 110/02 |
| 29 23 206 | 12/1980 | Germany . |
| B 53 036512 | 10/1993 | Japan . |
| 725932 | 1/1995 | Japan . |
| WO 93/11184 | 6/1993 | WIPO . |
| WO9503338 | 2/1995 | WIPO . |
| WO 96/11963 | 4/1996 | WIPO . |
| WO 96/23010 | 8/1996 | WIPO . |

OTHER PUBLICATIONS

Aldrich Catalog of Fine Chemicals, 1996–1997; pp. 961–962.

Whelan, T. "Polymer Technology Dictionary," Chapman & Hall, London, 1994, pp. 1,312.

Brintzinger, Hans H., et al., *Stereospecific Olefin Polymerization with Chiral Metallocene Catalysts*, Angew. Chem. Int. Ed. Engl. 1995, 34, pp. 1143–1170.

Johnson, et al., J. Am. Chem. Soc., 1995, 117, 6414–6415 and supplemental material.

PMSE Abstracts, vol. 73, p. 458, Fall, 1995, Proceedings of the American Chemical Society, Fall 1995, Chicago, IL.

Safir et al., Macromolecules, 1995, 28, 5396–5398.

Johnson et al., J. Am. Chem. Soc., 1996, 118, 267–268.

M. Brookhart, L.K. Johnson, C.M. Killian, S. Mecking, D.J. Tempel, *Polymer Preprints*, 1996, 37, 254–255.

H.T. Dieck, M. Svoboda, T. Greiser, Z. *Naturforsch*, 36b, 1981, 823–832.

R. Rulke, J.M. Ernsting, A.L. Spek, C. Elsevier, PWNM van Meeuwen, K. Vrieze, *Inorg. Chem.*, 1993, 32, 5769–5778.

M. Brookhart, B. Grant, A.F. Volpe, Jr., *Organometallics*, 1992, 11, 3929–3922.

E. Hauptman, R.M. Waymouth, J.W. Ziller, *J. Am. Chem. Soc.*, 1995, 117, 11586–11587.

*Primary Examiner*—David W. Wu
*Attorney, Agent, or Firm*—Lorraine R. Sherman; Melanie Gover

[57] ABSTRACT

A polymerizable composition comprises an alpha-olefin hydrocarbon monomer, an effective amount of an organometallic catalyst of a Group VIII metal, preferably Ni or Pd, and at least one of water and air. Novel catalysts for polymerizing alpha-olefin hydrocarbon monomers provide improved processes and products. Methods of the invention include polymerizing the composition in open air and in the presence of water to provide novel polymers.

35 Claims, No Drawings

POLYMERIZABLE COMPOSITIONS COMPRISING ALPHA-OLEFIN HYDROCARBON MONOMERS AND METHODS OF USE THEREFOR

This application is a continuation-in-part of U.S. Ser. No. 08/591,449, filed Nov. 6, 1995 now abandoned.

FIELD OF THE INVENTION

This invention relates to polymerizable compositions comprising alpha-olefin hydrocarbon monomers and a method for their polymerization, wherein the method is tolerant of both oxygen and water. Catalysts for the polymerization include organometallic complexes of Group VIII metals (CAS version of the Periodic Table), preferably Pd or Ni. Methods for polymerizing the polymerizable composition in open air and in the presence of water to provide novel polymers are described.

BACKGROUND OF THE INVENTION

Non-free radical polymerizations of ethylenically-unsaturated monomers are well known. Typically, these polymerizations use catalysts instead of initiators to effect polymerizations. Examples of such catalyzed polymerizations include Ziegler-Natta (ZN) polymerizations of alpha-olefins, ring-opening metathesis polymerizations (ROMP) of cyclic olefins, group-transfer polymerizations (GTP), and cationic and anionic polymerizations of activated olefins such as styrene or acrylate esters. More recently, metallocene catalysts have received considerable attention for polymerization of alpha-olefins. ZN and metallocene catalysts for alpha-olefin polymerizations are susceptible to deactivation by adventitious oxygen and water, requiring that such deactivating materials be rigorously excluded from all reagents as well as the reaction vessel.

European Patent Application No. 454231 describes a polymerization catalyst and a method of polymerizing ethylene, other olefins, and alkynes using a polymerization catalyst whose cationic portion has the formula

LM—R⁺ wherein M is a Group VIII metal, L is a ligand or ligands stabilizing the Group VIII metal, and R is H, a hydrocarbyl radical or a substituted hydrocarbyl radical, and a substituted tetraphenylborate anion as the counterion. A preferred cationic portion has the formula

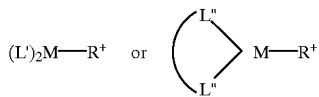

wherein L' is a two-electron donor ligand and

are chelating ligands wherein each L" is a neutral two-electron donor ligand, and M is nickel or palladium. All olefin polymerizations were conducted with ethylene, were carried out under dry, oxygen-free nitrogen atmospheres and all solvents were thoroughly dried under nitrogen by distillation from, e.g., sodiun/benzophenone. High polymer ($M_w$>90,000) was not disclosed.

Johnson et al., (J Am. Chem. Soc., 1995, 117, 6414–6415 and supplementary material) describe Pd(II)- and Ni(II)-based catalysts for alpha-olefin polymerizations wherein the catalysts are, for example, cationic metal methyl complexes of the general formula

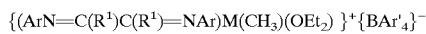

wherein M is Pd or Ni, Ar' is 3,5-$C_6H_3(CF_3)_2$, Ar is 2,6-$C_6H_3$(R') where R' is isopropyl or methyl; $R^1$ is H, methyl, or the two $R^1$ groups taken together are 1,8-naphthalene-diyl. All polymerizations were carried out in inert atmospheres, and polymers of ethylene, propene, and 1-hexene are reported. The same authors and S. J. McLain et al. reported that the same catalysts copolymerized ethylene and methyl acrylate (see PMSE Abstracts, Vol. 73, p. 458, Fall 1995, Proceedings of the American Chemical Society, Fall 1995, Chicago, Ill.). A full publication describing these findings and a catalyst {(ArN=C($R^1$)C($R^1$)=NAr)M($CH_2$ $CH_2CH_2$C($OR^2$)(C=O))}⁺B$Ar'_4$⁻ are reported by Johnson et al. (J. Am. Chem. Soc., 1996, 118, 267–268 and supplementary material), wherein $R^2$ can be —$CH_3$, t-butyl, or —$CH_2(CF_2)_6CF_3$, and $R^1$, Ar, and Ar' are as defined above. These findings also appeared in M. Brookhart, L. K. Johnson, C. M. Killian, S. Mecking, D. J. Tempel, Polymer Preprints, 1996, 37, 254–255.

These catalysts were prepared in a multi-step sequence shown in Scheme I, below. The ligand (ArN=C($R^1$)C($R^1$)=NAr) (III) was prepared from 2,6-diisopropylaniline (II) and 1,2-dione O=C($R^1$)C($R^1$)=O (I), optionally in the presence of formic acid (H. T. Dieck, M. Svoboda, T. Greiser Z. Naturforsch. 36b, 1981, 823–832.). In a separate procedure, (1,5-cyclooctadiene)Pd$Cl_2$ (IV) was reacted with $Me_4$Sn to give (1,5-cyclooctadiene)PdCl (Me) (V) (R. Rulke, J. M. Emnsting, A. L. Spek, C. . Elsevier, P. W. N. M. van Meeuwen, K. Vrieze Inorg Chem., 1993, 32, 5769–5778). The ligand (ArN=C($R^1$)C($R^1$)=NAr) (III) and (1,5-cyclooctadiene) PdCl (Me) (V) were then reacted to give neutral organometallic compound (ArN=C($R^1$)C($R^1$)=NAr)PdCl(Me) (VI) (described in the previously cited Johnson et al., J. Am. Chem. Soc., 1995, 117, 6414–6415 and supplementary material ). This compound was further reacted with MgMe₂ to give (ArN=C($R^1$)C($R^1$)=NAr)Pd(Me)₂ (VII). In a separate procedure, NaB{3,5-$C_6H_3(CF_3)_2$}₄ (IX) was synthesized by treating {Br-3,5-$C_6H_3(CF_3)_2$} (VIII) with Mg, and reacting the product with Na$BF_4$ (M. Brookhart, B. Grant, A. F. Volpe, Jr. Organometallics 1992, 11, 3929–3922). CAUTION: This preparation of this salt is particularly hazardous in that trifluoromethyl aryl Grignards can explode (E. Hauptman, R. M. Waymouth, J. W. Ziller J. Am. Chem. Soc., 1995, 117, 11586–11587). Then Na{B(3,5-$C_6H_3(CF_3)_2$)₄} (IX) was converted to {H(O$Et_2$)₂}⁺{B(3,5-$C_6H_3(CF_3)_2$)₄}⁻ (X). Finally, {H(O$Et_2$)₂}⁺{B(3,5-$C_6H_3(CF_3)_2$)₄}⁻(X) and (ArN=C($R^1$)C($R^1$)=NAr)Pd(Me)₂ (VII) were reacted to give {(ArN=C($R^1$)C($R^1$)=NAr)M($CH_3$)(O$Et_2$)}⁺{B(3,5-$C_6H_3(CF_3)_2$)₄}⁻ (XI).

SCHEME I

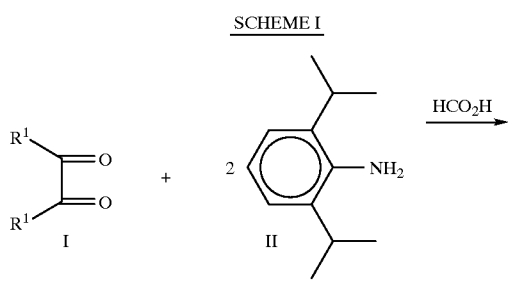

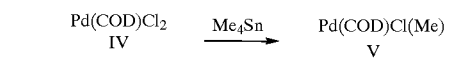

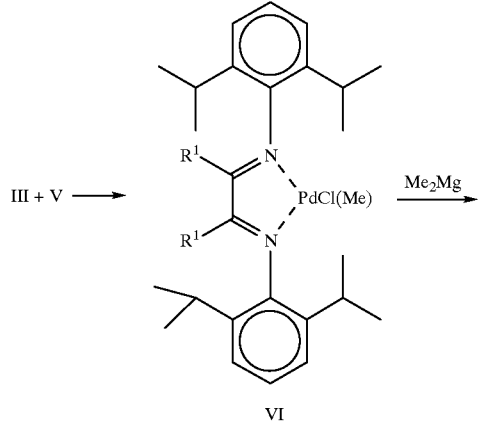

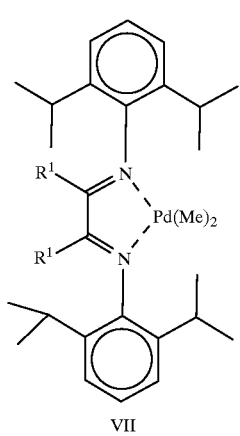

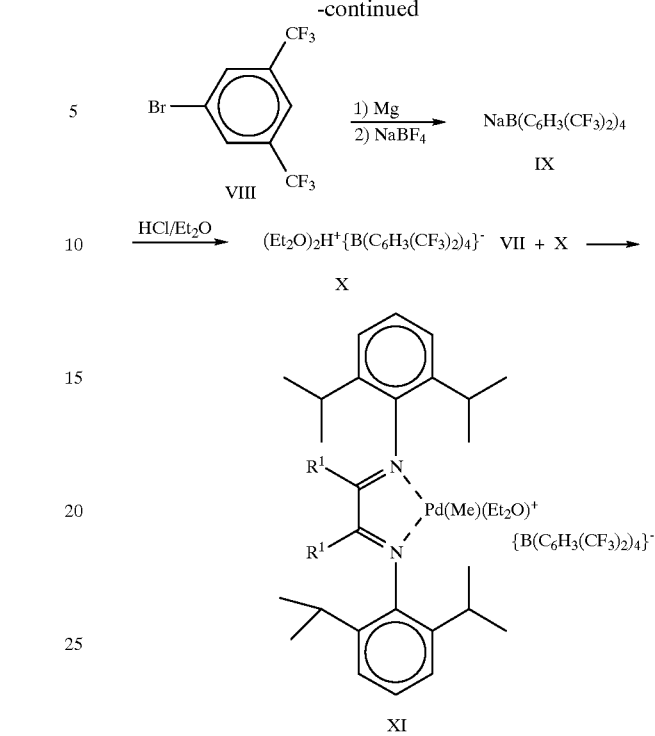

In Scheme I, $R^1$ is H or methyl, or the two $R^1$s taken together are 1,8-naphthalene-diyl, i.e.,

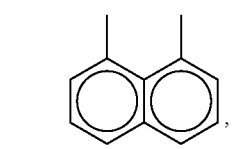

the ligand made from acenaphthenequinone; and "COD" refers to 1,5-cyclooctadiene.

U.S. Pat. No. 5,296,566 describes certain organometallic catalysts for ROMP of ring-strained cyclic olefins that are stable towards oxygen and water. However, these catalysts are ineffective for polymerization of linear alpha-olefin monomers.

Safir et al. (*Macromolecules*, 1995, 28, 5396–5398) describe bicyclic olefin polymerizations catalyzed by Pd(II)-alkyl complexes such as, e.g., hexafluoroacetylacetonato-σ, π-(2-acetylbicyclo{2.2.1}hepta-5-ene), related dimers, and (bicyclo{2.2.1}hepta-2,5-diene)PdCl$_2$, wherein the catalysts are reported to be stable to both air and moisture for extended periods, and are reported to catalyze olefin insertion polymerization of bicyclic olefins such as, e.g., norbornene. Polymerizations of alpha-olefins, even ethylene (the most reactive of the alpha-olefins), are not reported.

Japanese Patent Application No. JP 0725932 describes Group VIII catalysts (such as Ni) which polymerize ethylene. U.S. Pat. No. 4,724,273 describes the use of nickel catalysts to polymerize alpha-olefins, yielding polymers with methyl branching points. U.S. Pat. No. 5,030,606 describes nickel-containing catalysts which are useful for producing copolymers of ethylene and polar or non-polar comonomers.

European Patent Application No. 603,557 describes catalytic compositions prepared by contacting an organonickel compound with a cyclicazacarbyl compound which can be used to convert one or more olefins to oligomerization and/or polymerization products. Only ethylene is exemplified.

SUMMARY OF THE INVENTION

Briefly, the present invention describes a polymerizable composition comprising one or more alpha-olefin hydrocarbon monomers, an effective amount of an organometallic catalyst comprising a Group VIII metal (CAS version of the Periodic Table), preferably Ni or Pd, and a polydentate ligand providing steric bulk sufficient to permit formation of high polymer, and at least one of water and air.

In another aspect, the invention describes a method of polymerizing a composition, the composition comprising at least one alpha-olefin monomer, as catalyst an effective amount of the above-mentioned organometallic catalyst comprising a Group VIII metal, preferably Ni or Pd, and at least one of water and air.

In a further aspect, the present invention provides an alpha-olefin polymer comprising a plurality of $C_3$ or larger alpha-olefin units wherein the polymer $M_w$ is greater than 90,000, preferably greater than 100,000, and the polymer has an average number of branch points less than one per alpha-olefin unit.

In yet another aspect, the present invention provides a mixture comprising an alpha-olefin polymer comprising at least one of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01, preferably greater than 0.05, per alpha-olefin unit, the mixture further comprising water in an amount sufficient to form a second phase. Preferably, the polymer $M_w$ is greater than 90,000, and most preferably greater than 100,000.

In still another aspect, the present invention provides crosslinked alpha-olefin polymers. In one embodiment, a method employing high-energy irradiation of the polymer, preferably by electron beam irradiation, is used. In another embodiment, a method employing ultraviolet (UV) irradiation is used, preferably further comprising the addition of UV-activated crosslinking agents.

In another aspect, the present invention provides improved one-part catalysts which are organometallic salts useful for the polymerization of alpha-olefin monomers in the presence of at least one of water and air.

In a still further aspect, two-part catalysts comprising a neutral organometallic compound and a cocatalyst, useful for the polymerization of alpha-olefins, optionally in the presence of one or both of air and water, and methods of preparation thereof, are also provided.

In yet another aspect, the present invention provides an improved method of preparing an organometallic catalyst wherein a neutral organometallic compound is reacted with a salt of a non-coordinating counterion to give an organometallic salt as catalyst and a halide salt as by-product. Variations of the method involve different process conditions, to give one-part and two-part catalysts. Different variations may be preferred in specific applications.

In this invention:

"alpha-olefin" and "alpha-olefin hydrocarbon" are equivalent and mean a hydrocarbon containing a double bond in the 1-position, more particularly, ethylene or a 1-olefin containing three or more carbon atoms which can be acyclic or cyclic and preferably is an acyclic alpha-olefin;

"alpha-olefin polymer" means a polymer formed from at least one alpha olefin monomer which, not considering end groups, contains an average of two bonds connecting each monomer unit to other monomer units;

"branch point" means a CH unit in the polymer, bonded to three other carbon atoms, e.g.,

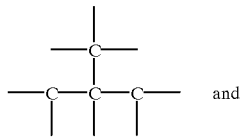

and

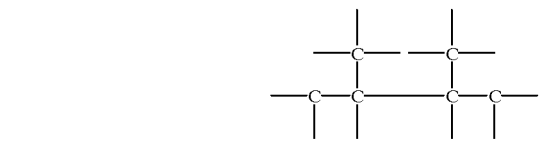

represent units with one and two branch points, respectively;

"steric bulk" means a size large enough and a location in the ligand sufficient to physically block access to non-polymerizing sites on the metal;

"alpha-olefin unit" means a group of carbon atoms in a polymer derived by polymerization from a single alpha-olefin molecule;

"high polymer" means a polymer having a weight average molecular weight ($M_w$) greater than 90,000, preferably greater than 100,000;

"poly" means two or more;

"organometallic catalyst" means a catalyst comprising a Group VIII metal, preferably one of Pd and Ni, a bidentate ligand having steric bulk sufficient to permit formation of high polymers, and a metal to R bond, wherein R is H, a hydrocarbyl radical, or a hydrocarbyl radical substituted by at least one alkyl, haloalkyl or aryl group, each group having up to 20 carbon atoms;

"group" means a chemical species that allows for substitution or which may be substituted by conventional substituents that do not interfere with the desired product;

"Me" means methyl ($CH_3$—);

"Et" means ethyl ($CH_3CH_2$—);

"Bu" means butyl; "t-Bu" means tertiary butyl;

"i-Pr" means isopropyl; and

"gel fraction" means the fraction of polymer that is insoluble in an appropriate solvent, e.g., toluene, particularly after crosslinking.

Surprisingly, polymerization reactions of the invention proceed in the presence of air and/or water at useful rates and produce in high yields high polymers that have useful properties. Water may occur naturally in the monomer, especially in liquid monomer. The polymerization reaction can even be carried out successfully in systems in which water is present or added in amounts sufficient to form a second (aqueous) phase. It is advantageous to be able to eliminate the costs and process steps associated with drying and deoxygenating monomers and solvents. Neither ZN nor metallocene catalysts containing Periodic Groups IIIB, IVB, or VB metals (CAS version of the Periodic Table) are active in the presence of oxygen or water. Cocatalysts, such as alkylaluminum compounds, methylaluminoxane, alkyl zinc compounds and the like, are also sensitive to air and moisture and are not useful under the conditions in this invention and organometallic catalysts employing these cocatalysts are outside the scope of this invention.

As noted above, useful polymers are made from the polymerizable compositions described herein. Depending on the process conditions, such as the amount of air or water present, the amount and type of catalyst, and the monomer or monomer(s) selected, polymers having different properties can be produced. Certain of these polymers may be preferred for specific applications. The polymers of the invention find use as functional and decorative coatings, as molded or extruded articles, and as binders.

In one embodiment, a distinct aqueous phase is present in the polymerizable composition such as in aqueous emulsion or suspension polymerizations and provides processing advantages such as reduction or elimination of organic solvents. Also, it provides a thermal sink to aid in process temperature control. In another embodiment, after polymerization, a distinct aqueous phase is present in addition to the polymer and this mixture provides processing advantages such as lower overall viscosity.

Polymerizable compositions comprising two or more monomers and copolymers produced from such compositions are also within the scope of the present invention.

DETAILED DESCRIPTION OF PREFERRED EMBODIMENTS OF THE INVENTION

The present invention describes a polymerizable composition comprising an alpha-olefin hydrocarbon monomer, an effective amount of an organometallic catalyst comprising a Group VIII metal (CAS version of the Periodic Table), preferably Ni or Pd, and a polydentate ligand having steric bulk sufficient to permit formation of high polymer, and at least one of water and air (oxygen).

Alpha-olefin hydrocarbon monomers useful in the invention include substituted and unsubstituted, including acyclic, branched, and cyclic alpha-olefins, wherein substituents on the olefin do not interfere with the polymerization process. Such optional substituents include carboxylic acid and ester groups. Alpha-olefins preferred for polymerizations of the invention can have from 2 to about 30 carbon atoms, and include acyclic alpha-olefins such as ethylene, propene, 1-butene, 1-pentene, 1-hexene, 1-heptene, 1-octene, 1-decene, 1-dodecene, 1-tetradecene, 1-hexadecene, 1-octadecene, 1-eicosene, and the like, and cyclic alpha-olefins such as cyclopentene, and combinations thereof Most preferably, alpha-olefins include propene, 1-butene, 1-hexene, 1-octene, and other alpha-olefins up to about $C_{20}$. In some embodiments, liquid monomers are preferred, and higher boiling alpha-olefins, e.g., 1-octene to about 1-hexadecene, are particularly preferred.

More than one monomer may be present in the polymerizable composition, and copolymers of two or more different monomers are within the scope of this invention. Copolymers may be random or blocky (block copolymers), depending on polymerization kinetics and processes. Useful comonomers can include other alpha-olefins, alkyl acrylates and methacrylates, and acrylic and methacrylic acids and salts thereof Organometallic catalysts useful in the invention comprise metals of Periodic Group VIII, ligands providing steric bulk sufficient to permit formation of high polymers, and a metal to R bond, wherein R is H, a hydrocarbyl radical, or a hydrocarbyl radical substituted by at least one of alkyl, haloalkyl or aryl groups. Periodic Group VIII metals include Fe, Ru, Os, Co, Rh, Ir, Ni, Pd, and Pt, and preferred metals are Co, Ni and Pd. Ni and Pd are especially preferred, and Pd is most preferred. Ligands (L) can be selected so that, when they are coordinated to the metal atom, they are of sufficient size so as to block steric access to certain coordination sites on the metal atom. Examples include ArN=C($R^1$)C($R^1$)=NAr, wherein Ar is 2,6-$C_6H_3(R^3)_2$, where each $R^1$ independently can be H or methyl or the two $R^1$ groups taken together can be 1,8-naphthalene-diyl, and each $R^3$ independently can be methyl, ethyl, isopropyl, or tert-butyl. Without wishing to be bound by theory, it is believed that blocking certain sites will reduce or eliminate processes which result in displacement of the polymer chain from the metal, which prematurely terminates polymerization and results in lower polymer molecular weights. Thus, steric bulk in the ligand permits the formation of high polymer.

Preferred catalysts comprise ligands that are chelating. Chelating means that a ligand molecule contains two or more atoms or groups of atoms that are able to form coordinate links to a central metal atom. Preferred atoms or groups of atoms are two-electron donors, preferably containing nitrogen, more preferably containing an imine

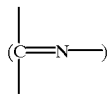

group. Most preferably a chelating ligand comprises two imine groups. Imine groups bearing a substituted or unsubstituted group on the nitrogen are preferred, more preferably such groups are polysubstituted aryl, and most preferably they are 2,6-disubstituted aryl. Substitutents on the aryl ring include alkyl, haloalkyl, and aryl, preferably alkyl, more preferably methyl or isopropyl, and most preferably isopropyl. Catalysts also comprise an atom or group R, defined below, which preferably is H or methyl, most preferably methyl.

Organometallic catalysts useful in the invention can be one-part or two-part. One-part catalysts are organometallic salts of a Group VIII metal and a polydentate ligand having steric bulk sufficient to permit formation of high polymer, and an anion selected from the group consisting of B($C_6F_5$)$_4^-$, $PF_6^-$, $SbF_6^-$, $AsF_6^-$, $BF_4^-$, B{3,5-$C_6H_3(CF_3)_3$}$_4^-$, ($R_fSO_2$)$_2CH^-$, ($R_fSO_2$)$_3C^-$, ($R_fSO_2$)$_2N^-$, and $R_fSO_3^-$, wherein $R_f$ is as defined below, which, when added to monomer, can immediately begin to form polymer, such that no additional reagents or further reactions are necessary to generate an active polymerization catalyst. Such catalysts are advantageous in certain processes, particularly when it is desired that a catalyst is to be added to the reaction mixture immediately before polymerization is to begin. For example, such catalysts can be useful in batch reactions used to prepare polymer. One-part catalysts can be isolated and are essentially pure compounds. One-part catalysts are preferably cationic complexes, and further comprise non-coordinating counterions.

Preparation of one-part Group VIII metal complexes useful as catalysts in polymerizable compositions of the invention have been described in the previously-mentioned European Patent Application No. 454,231, and the article by Johnson et al. (*J. Am. Chem. Soc.*, 1995, 117, 6414–6415), wherein these catalysts were disclosed to be useful in inert atmospheres. The catalysts were characterized as complexes having a cationic portion of the formula

wherein M is a Group VIII metal, L is a two-electron donor ligand or ligands, as defined above, stabilizing the Group VIII metal, and R is H, a hydrocarbyl radical or a substituted hydrocarbyl radical, wherein the substituting groups can be alkyl (1 to 10 carbon atoms), aryl (5 to 20 carbon atoms), or halogen substituted alkyl. In European Patent Application No. 454,231, M is exemplified as cobalt and a substituted tetraphenylborate anion is described as the counterion. Preferred in the reference is tetraarylborate with (CF$_3$) substituents and B{3,5-C$_6$H$_3$(CF$_3$)$_2$}$_4^-$ is exemplified A preferred cationic portion has the formula (L$^1$)$_2$M—R$^+$ wherein the two L$^1$ groups are joined through chemical bonds and each L$^1$ is a two-electron donor ligand as defined above, and M and R are as previously defined.

Johnson et al. (*J. Am. Chem. Soc.*, 1995, 117, 6414–6415) also describe catalysts comprising nickel or palladium and ligand groups chosen to provide steric bulk sufficient to permit formation of high polymer. In particular, preferred Pd(II)-and Ni(II)-based catalysts for olefin polymerizations are cationic metal methyl complexes of the general formula {(ArN=C(R$^1$)C(R$^1$)=NAr)M(CH$_3$)(OEt$_2$)}$^+$B{3,5-C$_6$H$_3$(CF$_3$)$_2$}$_4^-$ wherein M is Pd or Ni, Ar is 2,6-C$_6$H$_3$(R$^3$)$_2$ where R$^3$ is isopropyl or methyl, and each R$^1$ independently is H or methyl, or the two R$^1$ groups taken together are 1,8-naphthalene-diyl.

A preferred catalyst is

{((2,6-C$_6$H$_3$(i-Pr)$_2$)N=C(CH$_3$)C(CH$_3$)=N(2,6-C$_6$H$_3$(i-Pr)$_2$))Pd(CH$_3$)(Et$_2$O)}$^+${B(3,5-C$_6$H$_3$(CF$_3$)$_2$)$_4$}$^-$.

Also useful in polymerizable compositions of the invention are compounds of the formula {(ArN=C(R$^1$)C(R$^1$)=NAr)Pd(CH$_2$CH$_2$CH$_2$CO$_2$R$^2$)}$^+$BAr'$_4^-$ wherein R$^2$ can be —CH$_3$, t-butyl, or —CH$_2$(CF$_2$)$_6$CF$_3$, as reported by Johnson et al. (*J. Am. Chem. Soc.*, 1996, 118, 267–268 and supplementary material) to be useful in inert atmospheres.

Now, for the first time, it is recognized that alternative counterions can provide improved catalysts. Thus, the present invention provides new compositions of matter useful as one-part catalysts. One preferred counterion is B(C$_6$F$_5$)$_4^-$, which is safer to prepare than B(3,5-C$_6$H$_3$(CF$_3$)$_2$)$_4^-$, as judged by the number of reported explosions, and is commercially available from Boulder Scientific Company, Mead, CO, and provides better control over polymer molecular weight. Multiple reports have appeared concerning the hazards associated with the preparation of trifluoromethyl-substituted tetraarylborate compounds, including the explosion of intermediate aryl magnesium compounds (see I. C. Appleby, *Chemistry and Industry*, 1971, 120, and E. Hauptman, R. M. Waymouth, J. W. Ziller, *J. Amer. Chem. Soc.*, 1995, 117, 11586), and the explosive decomposition of solid lithium salt Li(C$_6$H$_4$(CF$_3$)$_2$) (M. Brookhart, B. Grant, A. F. Volpe, Jr., *Organometallics*, 1992, 11, 1320). The counterion B(C$_6$F$_5$)$_4^-$ is particularly preferred in polymerizable compositions comprising a second (aqueous) phase. Other anions useful as the anionic portion of the catalysts of the present invention may be generally classified as fluorinated (including highly fluorinated and perfluorinated) alkyl- or arylsulfonyl-containing compounds, as represented by Formulas XIIa through XIId:

(R$_f$SO$_2$)$_2$CH$^-$          (XIIa)

(R$_f$SO$_2$)$_3$C$^-$          (XIIb)

(R$_f$SO$_2$)$_2$N$^-$          (XIIc)

R$_f$SO$_3^-$          (XIId)

wherein each R$_f$ is independently selected from the group consisting of highly fluorinated or perfluorinated alkyl or fluorinated aryl radicals. Compounds of Formulas XIIa, XIIb and XIIc may also be cyclic, when a combination of any two R$_f$ groups are linked to form a bridge.

The R$_f$ alkyl chains may contain from 1–20 carbon atoms, with 1–12 carbon atoms preferred. The R$_f$ alkyl chains may be straight, branched, or cyclic and preferably are straight. Heteroatoms or radicals such as divalent non-peroxidic oxygen, trivalent nitrogen or hexavalent sulfur may interrupt the skeletal chain. When R$_f$ is or contains a cyclic structure, such structure preferably has 5 or 6 ring members, 1 or 2 of which can be heteroatoms. The alkyl radical R$_f$ is also free of ethylenic or other carbon-carbon unsaturation: e.g., it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group, and that any hydrogen atoms beyond the at least half replaced with fluorine that are not replaced with fluorine be replaced with bromine and/or chlorine. It is more preferred that at least two out of three hydrogens on the alkyl group be replaced with fluorine, still more preferred that at least three of four hydrogen atoms be replaced with fluorine and most preferred that all hydrogen atoms be replaced with fluorine to form a perfluorinated alkyl group.

The fluorinated aryl radicals of Formulas XIIa through XIId may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., CF$_3$.

Examples of anions useful in the practice of the present invention include: (C$_2$F$_5$SO$_2$)$_2$N$^-$, (C$_4$F$_9$SO$_2$)$_2$N$^-$, (C$_8$F$_{17}$SO$_2$)$_3$C$^-$, (CF$_3$SO$_2$)$_3$C$^-$, (CF$_3$SO$_2$)$_2$N$^-$, (C$_4$F$_9$SO$_2$)$_3$C$^-$, (CF$_3$SO$_2$)$_2$(C$_4$F$_9$SO$_2$)C$^-$, (CF$_3$SO$_2$)(C$_4$F$_9$SO$_2$)N$^-$, {(CF$_3$)$_2$NC$_2$F$_4$SO$_2$}$_2$N$^-$, (CF$_3$)$_2$NC$_2$F$_4$SO$_2$C$^-$(SO$_2$CF$_3$)$_2$, (3,5-bis(CF$_3$)C$_6$H$_3$)SO$_2$N$^-$SO$_2$CF$_3$, C$_6$F$_5$SO$_2$C$^-$(SO$_2$CF$_3$)$_2$, C$_6$F$_5$SO$_2$N$^-$SO$_2$CF$_3$, CF$_3$SO$_3^-$, C$_8$F$_{17}$SO$_3^-$,

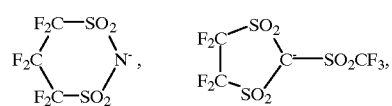

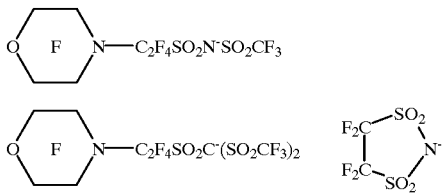

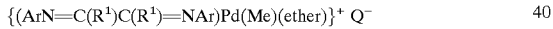

wherein F in the ring means the ring carbon atoms are perfluorinated, and the like. More preferred anions are those described by Formulas XIIb and XIIc wherein $R_f$ is a perfluoroalkyl radical having 1–4 carbon atoms.

Anions of this type, and representative syntheses, are described in, e.g., U.S. Pat. Nos. 4,505,997, 5,021,308, 4,387,222, 5,072,040, 5,162,177, and 5,273,840, incorporated herein by reference, and in Turowsky and Seppelt, *Inorg. Chem.*, 1988, 27 2135–2137. $\{C(SO_2CF_3)_3\}^-$, $\{N(SO_2CF_3)_2\}^-$ and $\{N(SO_2C_2F_5)_2\}^-$ are preferred, and $\{N(SO_2CF_3)_2\}^-$ and $\{N(SO_2C_2F_5)_2\}^-$ are particularly preferred. Such counterions may be preferred with certain metals and ligands, or in some processes. Other useful fluorinated non-coordinating counterions include $PF_6^-$, $SbF_6^-$, $AsF_6^-$, and $BF_4^-$.

In the preparation of one-part catalysts of the invention, diethyl ether can be useful but it is preferable to avoid its use because it can be dangerous to store and handle due to its extreme flammability and tendency to form explosive peroxides. Alternative useful ethers are organic compounds containing one ether-type oxygen atom and include tetrahydrofuran and methyl t-butyl ether. Methyl t-butyl ether is particularly preferred.

Thus, the present invention provides improved one-part catalysts useful for the polymerization of alpha-olefin monomers. These catalysts are designed with the advantages of improved counterions and ethers, and are new compositions of matter. Preferred compositions can be of the formula $$\{(ArN=C(R^1)C(R^1)=NAr)Pd(Me)(ether)\}^+ \; Q^-$$

wherein Ar and $R^1$ are as previously defined and ether can be tetrahydrofuran, diethyl ether, or methyl t-butyl ether, and Q can be selected from $B(C_6F_5)_4$, anions as shown in Formulas XIIa through XIId, $PF_6$, $SbF_6$, $AsF_6$, and $BF_4$. Particularly preferred are compounds wherein ether is methyl t-butyl ether and Q is selected from $B(C_6F_5)_4$ and anions as shown in Formulas XIIa through XIId. Examples of preferred novel one-part catalysts include:

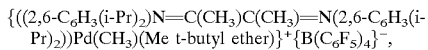
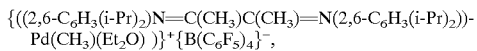
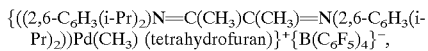
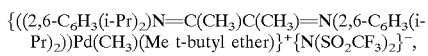
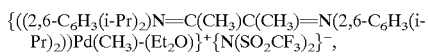
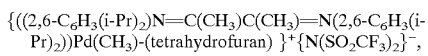
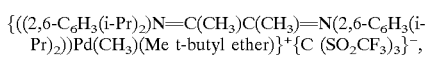
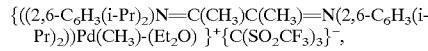
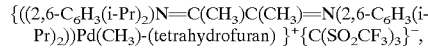
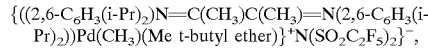
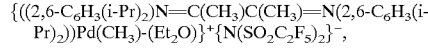
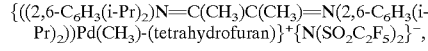
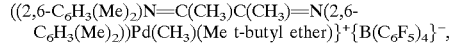
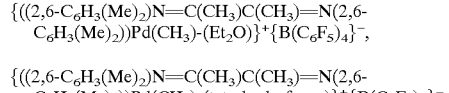
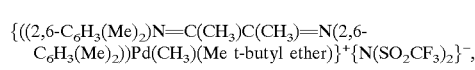
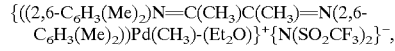
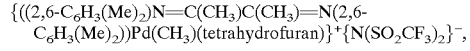
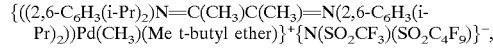
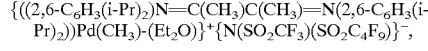
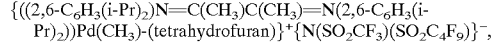
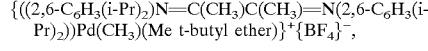
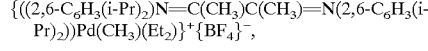
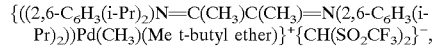
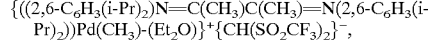
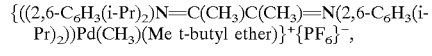
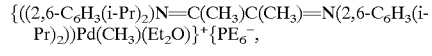
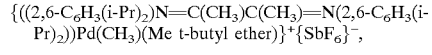
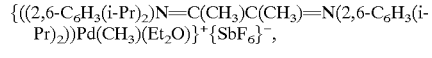
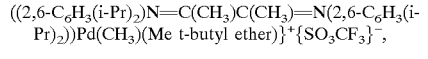
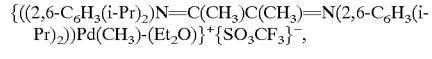
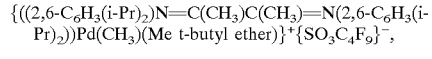
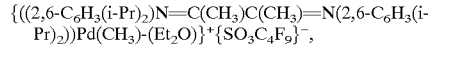

and

{((2,6-C$_6$H$_3$(i-Pr)$_2$)N=C(CH$_3$)C(CH$_3$)=N(2,6-C$_6$H$_3$(i-Pr)$_2$))Pd(CH$_3$)(Et$_2$O)}{NSO$_2$(CF$_2$)$_2$SO$_2$}$^-$.

Two-part catalysts comprise two reagents, a neutral organometallic compound and a cocatalyst salt, that react upon mixing optionally in the presence of monomer to yield an active catalyst. Two-part catalysts are particularly advantageous when partial mixing of monomer and an organometallic compound is desired (such as to achieve good solubility or suspension) but when it is also desired to initiate polymerization at a later time, for instance, when the second reagent is added. Process advantages resulting from the ability to control the time at which polymerization begins are significant. Two-part catalysts may also allow for the in situ generation of active catalytic compounds which cannot be isolated, and may also be preferred for those situations where the added time and expense of isolating a one-part catalyst are not warranted.

Two-part catalysts preferably comprise a neutral organometallic Pd or Ni compound which includes a ligand or ligands as previously defined, a moiety R which is H, hydrocarbyl radical, or substituted hydrocarbyl radical, and a halogen atom (preferably chlorine), and a cocatalyst. Preferred neutral compounds can be of the general formula {ArN=C(R$^1$)C(R$^1$)=NAr}M(R)X where Ar, R and R$^1$ are as defined above, and X represents a halogen atom, preferably chlorine or bromine, most preferably chlorine.

Examples of preferred neutral compounds include:
(2,6-dimethylphenyl)N=C(Me)C(Me)=N(2,6-dimethylphenyl)Pd(Me)Cl,
(2,6-diisopropylphenyl)N=C(Me)C(Me)=N(2,6-diisopropylphenyl)Pd(Me)Cl,
(2,6-dimethylphenyl)N=C(H)C(H)=N(2,6-dimethylphenyl)Pd(Me)Cl,
(2,6-diisopropylphenyl)N=C(H)C(H)=N(2,6-diisopropylphenyl)Pd(Me)Cl,
(2,6-dimethylphenyl)N=(1,2-acenaphthylene-diyl)=N(2,6-dimethylphenyl)Pd)Me)Cl, wherein 1,2-acenaphthylene-diyl is represented by the structure

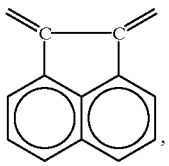

(2,6-diisopropylphenyl)N=(1,2-acenaphthylene-diyl)=N(2,6-diisopropylphenyl)) Pd(Me)Cl,
(2,6-dimethylphenyl)N=C(Me)C(Me)=N(2,6-dimethylphenyl)Ni(Me)Cl,
(2,6-diisopropylphenyl)N=C(Me)C(Me)=N(2,6-diisopropylphenyl)Ni(Me)Cl,
(2,6-dimethylphenyl)N=C(H)C(H)=N(2,6-dimethylphenyl)Ni(Me)Cl,
(2,6-diisopropylphenyl)N=C(H)C(H)=N(2,6-diisopropylphenyl)Ni(Me)Cl,
(2,6-dimethylphenyl)N=(1,2-acenaphthylene-diyl)=N(2,6-dimethylphenyl)Ni(Me)Cl, and
(2,6-diisopropylphenyl)N=(1,2-acenaphthylene-diyl)=N(2,6-diisopropylphenyl)) Ni(Me)Cl.

Especially preferred neutral compounds include
(2,6-dimethylphenyl)N=C(Me)C(Me)=N(2,6-dimethylphenyl)Pd(Me)Cl and
(2,6-diisopropylphenyl)N=C(Me)C(Me)=N(2,6-diisopropylphenyl)Pd(Me)Cl.

Useful cocatalyst salts are of the general formula

A$^+$Q$^-$ wherein A is selected from silver, thallium, and metals of Periodic Group IA, and Q is selected from B(3,5-C$_6$H$_3$(CF$_3$)$_2$)$_4$, B(C$_6$F$_5$)$_4$, anions as shown in Formulas XIIa through XIId, PF$_6$, SbF$_6$, AsF$_6$, and BF$_4$, and solvates and hydrates thereof. For some applications, silver salts are preferred and can have the formulae Ag{B(C$_6$F$_5$)$_4$}(arene)$_p$ and Ag{B(C$_6$H$_3$(CF$_3$)$_2$)$_4$}(arene)$_p$ wherein arene can be an aromatic hydrocarbon group having 6 to 18 carbon atoms that can be substituted by up to 6 alkyl or aryl groups each having up to 12 carbon atoms, preferably arene can be benzene, toluene, ortho-, meta-, or para-xylene, and mesitylene, and p can be an integer 1, 2, or 3. However, in some applications the less expensive alkali metal salts (Periodic Group IA) are preferred. Particular counterions may be preferred under specific reaction conditions. For example, in two-part systems comprising a second aqueous phase, B(C$_6$F$_5$)$_4$ is preferred.

Examples of preferred cocatalyst salts include:
Ag$^+${B(C$_6$F$_5$)$_4$}$^-$(toluene)$_3$, Ag$^+${B(C$_6$F$_5$)$_4$}$^-$(xylene)$_3$, Ag$^+${B(3,5-C$_6$H$_3$(CF$_3$)$_2$)$_4$}$^-$ (toluene), Li$^+${B(C$_6$F$_5$)$_4$}$^-$, Na$^+${(B(3,5-C$_6$H$_3$(CF$_3$)$_2$)$_4$}$^-$, Li$^+${N(SO$_2$CF$_3$)$_2$}$^-$, Li$^+${B(C$_6$F$_5$)$_4$}$^-$(Et$_2$O)$_2$, Li$^+${N(SO$_2$CF$_3$)(SO$_2$C$_4$F$_9$)}$^-$, Li$^+${N(SO$_2$C$_2$F$_5$)$_2$}$^-$, Li$^+${N(SO$_2$C$_2$F$_5$)$_2$}$^-$(hydrate), Li$^+${(N(SO$_2$C$_4$F$_9$)$_2$}$^-$, Li$^+${ NS$_2$(CF$_2$)$_2$}$^-$, Ag$^+${C(SO$_2$CF$_3$)$_3$}$^-$, Li$^+${C(SO$_2$CF$_3$)$_3$}$^-$, Ag$^+${CH(SO$_2$CF$_3$)$_2$}$^-$, Li$^+${CH(SO$_2$CF$_3$)$_2$}$^-$, Ag$^+${BF$_4$}$^-$, Na$^+${BF$_4$}$^-$, Na$^+${PF$_6$}$^-$, Ag$^+${PF$_6$}$^-$, Na$^+${SbF$_6$}$^-$, Ag$^+${SbF$_6$}$^-$, Na$^+${AsF$_6$}$^-$, Ag$^+${AsF$_6$}$^-$, Ag$^+${SO$_3$CF$_3$}$^-$, Na$^+${SO$_3$CF$_3$}$^-$, Na$^+${SO$_3$C$_4$F$_9$}$^-$, and Ag$^+${SO$_3$C$_4$F$_9$}$^-$.

One- and two-part catalysts can be present in the invention mixture in the range of 0.0001 to about 3 weight percent, preferably 0.001 to 1 weight percent.

The present invention provides an improved method of preparation of organometallic catalyst. In this method, a neutral organometallic compound is reacted with a salt of a non-coordinating counterion preferably comprising fluorine (F) to give an organometallic catalyst and a halide salt as by-product. Preferably, there is at least one mole of A$^+$Q$^-$ per mole of neutral organometallic compound. In some cases, excess A$^+$Q$^-$ may be preferred since A$^+$Q$^-$ may function as a surfactant in the reaction mixture.

Variations of the method involve different process conditions, to give one-part and two-part catalysts. Different variations may be preferred in specific applications. However, in each of the variations, the improved method provides significant advantages over the method of Johnson et al. As described therein, referring to Scheme I, the neutral organometallic compound {(Ar)N=C(R$^1$)C(R$^1$)=N(Ar)}PdCl(CH$_3$) (Compound V) is treated with Me$_2$ Mg, an air- and water-sensitive material which is hazardous to handle. This step results in {(Ar)N=C(R$^1$)C(R$^1$)=N(Ar)}Pd(CH$_3$)$_2$ (Compound VI) in poor yields of 25 to 34 percent. In a separate step, the salt of a non-coordinating counterion Na$^+${B(3,5-C$_6$H$_3$(CF$_3$)$_2$)$_4$}$^-$ (Compound IX) is converted to (Et$_2$O)$_2$H$^+${B(3,5-C$_6$H$_3$(CF$_3$)$_2$)$_4$}$^-$ (Compound X) in a procedure requiring the use of corrosive materials. Compounds VII and X are then reacted, under carefully controlled conditions, to give one-part catalyst {{(Ar)N=C(R$^1$)C(R$^1$)=N(Ar)}Pd(CH$_3$)(Et$_2$O)}$^+${B(3,5-C$_6$H$_3$(CF$_3$)$_2$)$_4$}$^-$ (Compound XI). In contrast, the method of this invention uses one step instead of three, requires only simple and inexpensive process conditions, and provides catalyst in good yield, typically greater than 75 percent.

The first variation of the method provides a one-part catalyst by reacting the silver salt of a non-coordinating counterion Ag$^+$Q$^-$, wherein Q is as defined above, or solvate thereof with a neutral organometallic compound of the formula

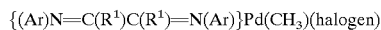
{(Ar)N=C(R$^1$)C(R$^1$)=N(Ar)}Pd(CH$_3$)(halogen)

wherein Ar and R$^1$ are as previously described, and halogen is Cl, Br, or I, preferably Cl or Br, most preferably Cl. The reaction is conducted in an ether solvent, or mixture of solvents containing an ether at or near room temperature (20° to 25° C.). The one-part catalyst is isolated from the reaction mixture by removal of solvent. Optionally, filtration to remove and recover AgCl by-product and further purification by methods such as solvent extraction (for example, dissolution of catalyst in an organic solvent such as CH$_2$Cl$_2$, optional filtration, washing of this solution with a portion of water, and removal of organic solvent) or recrystallization are apparent to those skilled in the art and are within the scope of this invention. One-part Pd catalysts have been prepared according to this method with various counterions, including {N(SO$_2$C$_4$F$_9$)$_2$}$^-$, {CH(SO$_2$CF$_3$)$_2$}$^-$, (SO$_3$CF$_3$)$^-$, (SbF$_6$)$^-$, (BF$_4$)$^-$, and (PF$_6$)$^-$. This method is particularly preferred for counterions wherein the corresponding silver salt is readily available. It is also a useful method for rapid synthesis when water-sensitive counterions are used.

In the second variation of the method, an alkali metal salt of a non-coordinating anion is dissolved in water and treated with a molar equivalent of AgNO$_3$ at or near room temperature (20° to 25° C.). Within minutes, a reaction occurs. While not wishing to be bound by theory, the reaction product is believed to be the silver salt of the non-coordinating anion, stabilized by one or more water (solvent) molecules. This aqueous solution is then mixed with an organic ether solution of {(Ar)N=C(R$^1$)C(R$^1$)=N(Ar)}Pd(CH$_3$)(halogen) wherein halogen is as defined above, and reaction occurs rapidly, essentially as fast as reagents in this two-phase system can mix across phase boundaries. The organic layer is separated from solid AgCl (which may be recovered and recycled) and the aqueous layer, and removal of solvent produces clean one-part Pd catalyst in good yield. This method is preferred because it provides for rapid synthesis of one-part catalyst in good yield, and does not require the preparation and isolation of the silver salt of a non-coordinating counterion. This procedure has been used to prepare one-part Pd catalysts containing the following counterions: {C(SO$_2$CF$_3$)$_3$}$^-$, {B(C$_6$H$_5$)$_4$}$^-$, {B{3,5-C$_6$H$_3$(CF$_3$)$_2$}$_4$}$^-$, (SO$_3$C$_4$F$_9$), N(SO$_2$CF$_3$)$_2^-$, N(SO$_2$C$_2$F$_5$)$_2^-$, and

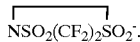
NSO$_2$(CF$_2$)$_2$SO$_2^-$.

A third variation of the method involves reaction of an alkali metal salt of a non-coordinating counterion with {(Ar)N=C(R$^1$)C(R$^1$)=N(Ar)}Pd(CH$_3$)(halide). With this variation there is no need to use expensive silver compounds, but longer reaction times are required. This method is preferred because it provides a safe, easy and inexpensive synthesis of one-part catalyst. This variation has been used with Li{B(C$_6$F$_5$)$_4$}.

A fourth variation of the method provides two-part catalysts. In this variation, a neutral organometallic compound as defined in the third variation is used in combination with a cocatalyst comprising a silver salt of a non-coordinating counterion. The advantages of two-part catalysts have been previously described.

A fifth variation of this method provides two-part catalysts useful in two-phase systems. This variation of a two-part catalyst comprises a neutral organometallic compound as described above and a cocatalyst of a Group IA metal in a two phase system. Such a catalyst system may be preferred because the second (preferably aqueous) phase provides a heat sink which moderates polymerization exotherms. This variation also avoids the expense of silver-containing reagents. In the presence of an aqueous phase, these two-part catalysts rapidly initiate polymerization. Adjuvants optionally useful in any of the methods of catalyst synthesis of the invention include solvents such as methylene chloride, and the like.

Additives, adjuvants and fillers as are known in the art can be added to the polymerizable composition of the invention, providing they do not interfere with the intended polymerization process or adversely affect the chemical and physical properties of the resultant polymers. Additives, adjuvants and fillers can include, but are not limited to, glass or ceramic microspheres or microbubbles, pigments, dyes, or other polymers. Adjuvants may be present in the composition in the range of 0.1 to 90 weight percent.

Surprisingly, it has been demonstrated that relatively acidic organic compounds such as, e.g., phenols and carboxylic acids, can be present in the polymerizable compositions of the invention without deleterious effect on the subsequent polymerization reaction. Thus, polymerization of 1-octene in the presence of Irganox 1010™, a hindered Phenol stabilizer commercially available from Ciba-Geigy Corp., has been demonstrated to proceed to completion in the same time period and with the same yield as polymerization of 1-octene in the absence of the stabilizer. Hindered Phenol stabilizers useful in the invention are well known to those skilled in the art, and are described in Jesse Edenbaum, *Plastics Additives and Modifiers Handbook*, Van Nostrand Reinhold, New York (1992) pp. 193–207. It is advantageous to add hindered Phenol stabilizers to polymers to improve polymer performance and aging. It is particularly advantageous to add the stabilizer to liquid monomer. Mixing is easier in monomer than in viscous polymer, and certain processes or product constructions may not allow for addition of stabilizer at a later stage in the process. Other acidic additives, such as carboxylic acids, may be advantageous to modify process conditions.

Other stabilizers containing phosphorus, for example, as phosphine or phosphite, are also known as additives in polymers. These secondary antioxidants halt polymerization. They can therefore be useful for stopping polymerization as, for example, when it is desired to prevent formation of very viscous solutions, and they may also provide other benefits, for example, lighter color, but they are not usefully added to monomer prior to polymerization. Sulfur containing compounds such as thiols are also useful in halting polymerization, as are strong oxidants such as bleach (sodium hypochlorite).

Monomers or comonomers containing organic functional groups, such as carboxylic acids, and carboxylic acid salts and carboxylic esters, can also be useful in the invention. Such monomers may be useful to modify polymer properties.

When water is present in major amounts above the solubility limit of the organic phase, it forms a second (aqueous) phase which can provide process advantages such as lower overall viscosity, higher polymer molecular weight or yield, temperature control, reduction or elimination of organic solvents, and is preferred in certain applications. The aqueous phase may be continuous, discontinuous, or cocontinuous with the organic phase.

Polymerizable compositions may further comprise surfactants. Surfactants are preferred when a second aqueous phase is present. Ionic surfactants are preferred. Suitable surfactants include sodium and ammonium sulfonates. Specific examples of suitable surfactants include sodium heptadecyl sulfate, sodium lauryl sulfate, and ammonium lauryl sulfate. Certain surfactants contain groups which reduce catalyst activity, and these should be avoided in the practice of this invention. In particular, polyether groups and halides, such as are found in polyether sulfonate or tetraalkylammonium halide surfactants, should be avoided. Surfactants can be present in the composition in the range of about 0.01 to 5 weight percent.

The present invention also is directed toward a method of polymerizing a composition comprising at least one alpha-olefin monomer, an effective amount of an organometallic complex of a Group VIII metal, preferably Ni or Pd, as a catalyst, and at least one of water and air.

Polymerizations of the invention have been demonstrated to take place both in open air and in the presence of water. In a typical open-air polymerization, the above-mentioned one- or two-part palladium catalyst is mixed with the alpha-olefin monomer (for example, 1-octene) in a container and polymerization is allowed to proceed. Optionally, organic solvents may be used to dissolve or disperse catalysts and may be present in amounts from about 0.5 to 99 percent by weight.

For two-part systems, several variations in polymerizations of the invention have been demonstrated: in method (A), the neutral organometallic compound and cocatalyst salt can be mixed together and added to the monomer; in method (B), the monomer can be mixed with neutral organometallic compound and the cocatalyst salt subsequently added to that mixture; in method (C), two separate monomer streams, one containing neutral organometallic compound and one containing cocatalyst salt can be mixed. Such process variability allows for the control of the onset of polymerization. Other process advantages such as solubilizing the organometallic compound or cocatalyst salt may also be achieved. Advantages of further variations in the order of mixing are apparent to those skilled in the art, and are within the scope of this invention.

Polymerizations can be conducted at various temperatures. Preferably, the reaction temperature is $-78°$ to $+35°$ C., more preferably $-40°$ to $+25°$ C., and most preferably $-10°$ to $+20°$ C. Temperatures above about $40°$ C. may deactivate the catalyst, and good thermal control may be preferred since the polymerization of alpha-olefin monomers is exothermic. It may be particularly advantageous to employ a second aqueous phase as a heat sink to aid in the control of reaction temperature.

Polymerizations can be conducted at pressures greater than atmospheric, particularly in cases where one or more of the monomers is a gas. However, to avoid the expense of pressurized reaction vessels, liquid monomers may be preferred.

In another embodiment, catalyst and monomer can be mixed and coated onto a substrate, and the mixture allowed to polymerize without protection from the ambient atmosphere. Particularly preferred are monomers with boiling points greater than about $100°$ C., such as 1-octene and higher alpha-olefin monomers. Variations in temperature, concentration and the like may be employed. See: European Patent Application No. 694,575.

Water can be present in the polymerizable composition and during polymerization in the range of 0.001 up to 99 weight percent of the total composition.

Water may be present in minor amounts when care is not taken to dry the monomer or optional organic solvents. Preferably it is present in naturally-occurring amounts, in monomers as supplied and handled in air. For example, water is soluble in 1-hexene to the extent of approximately 480 parts per million at room temperature, and such concentration is within the scope of the present invention, since water at that concentration is known to deactivate ZN and metallocene catalysts. Monomers are often supplied with varying amounts of water, from 0.001 weight percent up to the maximum solubility of water in the monomer, depending on temperature, specific monomer, ambient humidity, storage conditions, and the like. Optional solvents similarly contain varying amounts of water. Oxygen can be present in an amount of 0.001 to about 2 weight percent or more of the total composition. Monomers and solvents may contain varying amounts of oxygen from the atmosphere depending on temperature, specific monomer or solvent, storage conditions, and the like. Oxygen can also be present in atmospheric amounts in environments surrounding the polymerizable mixture, such as headspace in a reaction vessel. It is advantageous to avoid the expense and process steps of drying and deoxygenating monomer and solvent.

In other catalyzed alpha-olefin polymerizations, such as Ziegler-Natta and metallocene catalyzed polymerizations, it is necessary to remove water and oxygen from monomers, especially liquid monomers, by procedures including, but not limited to, sparging with inert gas such as nitrogen or argon, treating with molecular sieves, and scrubbing with highly water-reactive reagents such as sodium, alkyl-substituted aluminum or zinc compounds, and the like, then maintaining rigorously dry and oxygen-free conditions during addition of catalyst and polymerization of monomer. Such purified monomers and methods of purification and polymerization are outside the scope of this invention.

Surprisingly, polymerization of the present invention monomers can take place when water is present in sufficient amount to form a second aqueous phase. Surfactants can be added to the aqueous phase prior to or after addition of a mixture of monomer and catalyst, or in any other useful sequence. Depending on process conditions, such as stirring rate, amount of surfactant, and other additives, polymer particles of different properties, including particle size, may be formed. Agglomeration of polymer may occur, again depending on variables such as monomer, reaction temperature, and additives, and is desirable in some processes (for example, where polymer is to be separated from the water) and undesirable in others (for example, where polymer is to be coated from the aqueous mixture).

The present invention provides alpha-olefin polymers comprising a plurality of $C_3$ or larger alpha-olefin units wherein the polymer $M_w$ is greater than 90,000, preferably greater than 100,000, and the polymer has an average number of branch points less than one per alpha-olefin unit. Without wishing to be bound by theory and recognizing that state-of-the-art analytical techniques are inadequate to determine all structural features, particularly minor ones, it is believed that polymers obtained using catalysts of the invention consist essentially of two types of repeating units: $\{-CH_2-CHR^4-\}_x$ and $\{-(CH_2)_n-\}_y$ wherein n is the number of carbon atoms in the alpha-olefin monomer used to make the polymer and $R^4$ is $\{-CH_3(CH_2)_{(n-3)}-\}$. The number of branched units $\{-CH_2-CHR^4-\}$ is less than the total number of monomer units in the polymer, that is x has a value from 0.01 to 0.99, preferably 0.20 to 0.95, more preferably 0.40 to 0.90, and (x+y) has a value of 0.90 to 1.00. The polymer structure will vary as the monomer or monomers used in the polymerizable composition vary. For example, a polymer made from 1-octene, that is, n is 8, has a structure consisting essentially of {—$CH_2$—CH(n-hexyl)—}$_x$ and {—$(CH_2)_8$—}$_y$, wherein x is in the range 0.45 to 0.70, and (x+y) is in the range 0.90 to 0.98. In another example, a polymer made from 1-hexene, that is, n is 6, has a structure consisting essentially of {—$CH_2$—CH (n-butyl)—}$_x$ and {—$(CH_2)_6$—}$_y$, wherein x is in the range 0.50 to 0.75, and (x+y) is in the range 0.90 to 0.98. Those skilled in the art will recognize that variations in polymerizable composition, such as the kind and amount of optional solvent or aqueous phase or the catalyst selected and polymerization method can affect the polymer structure. Polymer structure can affect polymer properties, such as crystallinity or modulus.

For many applications, a high polymer ($M_w$ over 90,000, preferably over 100,000, up to about 10,000,000, preferably up to about 2,000,000) is highly desirable, resulting in improved product performance. High polymers can be obtained by, for instance, an appropriate choice of catalyst-to-monomer ratio. In addition, high polymers can be obtained by continuing the polymerization reaction essentially to completion, that is, consumption of substantially all available monomer.

In some applications, a crosslinked polymer provides better product performance. Crosslinking may be accomplished during the polymerization reaction by copolymerization with a polyfunctional monomer, or may be effected by chemical reactions brought about by thermal means or actinic radiation, including high energy sources such as electron beams, gamma radiation, or ultraviolet irradiation, occurring after polymerization. Crosslinked polymers are within the scope of this invention.

Polyolefins prepared using organometallic catalysts described above, especially those comprising Ni or Pd, can be crosslinked via irradiation with electron beams at dosages preferably in the range of 20 MRad or less, more preferably 10 MRad or less. It is known that polyethylene can be crosslinked to produce a useful material upon irradiation without significant polymer degradation whereas polypropylene degrades much faster than it crosslinks, and polyolefins prepared via traditional Ziegler-Natta polymerizations are only modestly affected by irradiation. However, treatment of polyolefins of the present invention with electron beams produces crosslinked polymers as indicated by the presence of a polymer gel fraction. Advantageously, the crosslinked polyolefins are free of added chemical crosslinking agents that might otherwise impair the chemical or physical properties of the polymer or be disadvantageous in subsequent use, for example, due to color or leaching. Further, electron-beam crosslinking can be carried out after fabrication or other processing of the polyolefin by, e.g., extrusion, solvent casting, coating, molding, and the like, to give crosslinked shaped articles such as fibers, tubes, blocks, profiles, films, and the like. Other useful high-energy sources are known, and are within the scope of the present invention.

Polymers of the present invention can also be crosslinked by ultraviolet irradiation. Preferably, and without wishing to be bound by theory, additives that absorb ultraviolet light and subsequently react to give radicals by homolytic cleavage and/or hydrogen abstraction are mixed with the polymer prior to irradiation. Typical additives include trihalomethyl-substituted s-triazines (such as 2-(4-methoxyphenyl)-4,6-bis (trichloromethyl)-1,3,5-triazine), aryl alkyl ketones (such as acetophenone, benzoin ethers, and ketals of benzil), and diaryl ketones (such as benzophenone and anthraquinone).

Other useful additives will be apparent to those skilled in the art and are within the scope of this invention. Crosslinking by ultraviolet irradiation is preferred in certain processes and product constructions, wherein it is necessary to process an uncrosslinked polymer, as in a solution or an extrusion process, prior to crosslinking.

Alpha-olefin polymers of the present invention are useful as molded or extruded articles, as functional or decorative coatings, and as binders.

Objects and advantages of this invention are further illustrated by the following examples, but the particular materials and amounts thereof recited in these examples, as well as other conditions and details, should not be construed to unduly limit this invention.

EXAMPLES

For all trials described as occurring in air, reagents were used as supplied and were handled in air, with no attempt to reduce or remove oxygen or water in reagents, solvents or glassware. Solvents used were typical reagent grade, not anhydrous grade. "Ambient temperature" is approximately 23° C. Throughout these examples, the shorthand notation $C_z$ is used to refer to an alpha-olefin containing z carbons. Thus, $C_2$ is ethylene, $C_3$ is propylene, $C_6$ is 1-hexene, $C_8$ is 1-octene, and so on. All chemicals can be obtained from Aldrich Chemical Company (Milwaukee, Wis.) unless otherwise noted.

Molecular weights were determined by gel-permeation chromatography, referenced to polystyrene standards.

Preparation of Catalysts

Throughout these examples, the material referred to as Pd-A was {(2,6-diisopropylphenyl)N═C(Me)-C(Me)═N (2,6-diisopropylphenyl)}PdMeCl, prepared according to known procedures:

A. Synthesis of ligand (2,6-$C_6H_3$(i-Pr)$_2$)N═C($CH_3$) C($CH_3$)═N(2,6-$C_6H_3$(i-Pr)$_2$)

The ligand was prepared according to the procedure described in H. t. Dieck, M. Svoboda, T. Greiser *Z. Naturforsch.* 36b, 823–832. A mixture of 625 mL methanol, 41.7 g 2,3-butanedione, 171.75 g 2,6-diisopropylaniline and 6.75 g formic acid was prepared in air, then stirred under nitrogen atmosphere at ambient temperature for approximately 18 hr. A yellow precipitate formed, and was collected by filtration. The precipitate was recrystallized from hot ethanol to yield 152.6 gm of {2,6-$C_6H_3$(iPr)$_2$}N═C($CH_3$)C($CH_3$)═N{2,6-$C_6H_3$(i-Pr)$_2$}. This ligand can be handled and stored in air.

B. Synthesis of (1,5-cyclooctadiene)Pd(Me)Cl

The compound was prepared according to the procedure described in R. Rulke, J. M. Ernsting, A. L. Spek, C. . Elsevier, P. W. N. M. van Meeuwen, K. Vrieze *Inorg. Chem.*, 1993, 32, 5769–5778. All procedures were conducted in a dry nitrogen atmosphere. The bright yellow solid (1,5-cyclooctadiene)PdCl$_2$, 49.97 g, was placed in 1 L of dry, deoxygenated $CH_2Cl_2$. While stirring, 37.46 g Me$_4$Sn was added, and the reaction was stirred at ambient temperature for a total of about 4 days. Black solids (presumably Pd metal) formed, and were removed occasionally during this time by filtration through a pad of Fuller's Earth (filter aid). When the reaction solution was a pale yellow, it was filtered once more, and solvent was removed. There was obtained 63.94 g white (1,5-cyclooctadiene)Pd(Me)Cl. This compound is preferably handled in an inert atmosphere.

C. Synthesis of {{2,6-$C_6H_3$(i-Pr)$_2$}N═C($CH_3$)C ($CH_3$)═N{2,6-$C_6H_3$(i-Pr)$_2$}}(Pd($CH_3$)Cl This neutral organometallic compound was prepared according to the procedure described in L. K.Johnson, C. M.

Killian, M Brookhart *J. Am. Chem. Soc.*, 1995, 117, 6414–6415 and supplementary material. In an inert atmosphere (nitrogen), 31.64 g (1,5-cyclooctadiene)Pd(Me)Cl (synthesis B, above) was placed in 375 mL of dry deoxygenated diethyl ether. The (1,5-cyclooctadiene)Pd(Me)Cl was not completely dissolved. To this mixture was added 48.31 g $\{2,6\text{-}C_6H_3(i\text{-}Pr)_2\}N=C(CH_3)C(CH_3)=N\{2,6\text{-}C_6H_3(i\text{-}Pr)_2\}$ (synthesis A, above). An orange precipitate soon formed. The reaction mixture was stirred for about 18 hr, after which 44.11 g $\{\{2,6\text{-}C_6H_3(i\text{-}Pr)_2\}N=C(CH_3)C(CH_3)=N\{2,6\text{-}C_6H_3(i\text{-}Pr)_2\}\}Pd(CH_3)Cl$ was collected by filtration. This compound can be handled and stored in air.

Example 1

Ag(toluene)$_3$B(C$_6$F$_5$)$_4$, referred to as Ag—A

Ag(toluene)$_3$B(C$_6$F$_5$)$_4$ was prepared as follows, and is referred to as Ag—A throughout these examples. Under a nitrogen atmosphere, using dry, oxygen-free solvents, a solution of 200 mL hexane, 50 mL diethyl ether, and 17.29 g BrC$_6$F$_5$ was cooled to −78° C. Thirty mL of 2.5M n-BuLi in hexane was added all at once with stirring. The reaction was stirred for 30 minutes, during which time an orange precipitate formed. (CAUTION! If it is necessary to discontinue the reaction at this point and deactivate reagents, it is reported that the reaction of LiC$_6$F$_5$ with water can result in an explosion; see E. Kinsella et al., *Chemistry in Britain,* 1971, 7, 457. In the practice of this invention, however, water is not added at this time.) Then 17.5 mL of BCl$_3$ (1.0M in hexane) was added dropwise. The reaction was allowed to slowly warm to room temperature, and allowed to stir for about 60 hours. The reaction mixture was filtered and solvent removed to give white, solid Li{B(C$_6$F$_5$)$_4$}(Et$_2$O)$_2$. Thirteen g of this product were placed in 250 mL CH$_2$Cl$_2$ and 60 mL toluene and filtered. AgBF$_4$ (3.14 g dissolved in 10.4 mL toluene) was added dropwise, and the reaction was allowed to stir for 30 minutes. The mixture was filtered again, and solvent removed from the filtrate under vacuum to give white to pink solid Ag—A. Spectroscopic data confirmed the structure. This compound was only stable as the toluene solvate, so care had to be taken not to use high temperatures or prolonged drying times.

Also prepared was Ag$^+$$\{B(3,5\text{-}C_6H_3(CF_3)_2)_4\}^-$(toluene). The compound Na$^+$$\{B(3,5\text{-}C_6H_3(CF_3)_2)_4\}^-$ was prepared as described in M. Brookhart, B. Grant, A. F. Volpe, Jr., *Organometallics* 1992, 11, 3929–3922. To remove associated water (two molecules of water per Na$^+$$\{B(3,5\text{-}C_6H_3(CF_3)_2)_4\}^-$) a solution of 0.92 g 2 A nmolecular Na$^+$$\{B(3,5\text{-}C_6H_3(CF_3)_2)_4\}^-$ in 20 mL toluene was stirred with 5 g sieves for 20 hours. The solution was filtered and to the filtrate was added with stirring a solution of 0.19 g AgBF$_4$ in 5 mL toluene. After 15 minutes a granular precipitate had formed, which was collected on a filter and, while still damp, extracted with 20 mL dichloromethane. The extract was clarified by filtration through Celite™ Filter Agent, and then dried under vacuum. Upon sufficient drying there was obtained 0.64 g of white powder. Analytical data confirmed the structure as Ag$^+$$\{B(3,5\text{-}C_6H_3(CF_3)_2)_4\}^-$(toluene).

Example 2

Polymerization of Alpha-Olefin Monomer in Air

This example illustrates the polymerization of 1-octene (C$_8$) in air.

Catalyst was prepared from 121 mg Pd—A and 190 mg Ag—A in 10.14 g tetrahydrofuran. For Sample 2-A (comparative), a 1.4 g portion of the catalyst solution was mixed with 4.70 g of dry, oxygen-free C$_8$ in inert atmosphere. For Sample 2-B, 0.75 g of catalyst solution was mixed with 4.8 g C$_8$ in air. For Sample 2-C, 1.5 g of catalyst solution was placed in a vial, and solvent was removed. The resulting solids were mixed with 5.0 g C$_8$ in air. Samples 2-A and 2-B became viscous within 15 minutes, forming polymer at similar rates. Sample 2-C became viscous and hot (due to the polymerization exotherm) within ten minutes. Comparison of Samples 2-A and 2-B showed that polymerization was occurring at comparable rates in air and inert atmosphere; note that 2-B contained less catalyst than 2-A. Sample 2-C showed a 100 percent solids (no solvent) formulation, which polymerized at a faster rate.

Sample 2-B, Polymer Analyses: $M_w$ 9.15×10$^4$, $M_n$ 6.05×10$^4$.

Sample 2-C, Polymer Analyses: $M_w$ 1.60×10$^5$, $M_n$ 3.71×10$^4$.

Example 3

Polymerization of Alpha-Olefin Monomer in Air

This example illustrates the polymerization of propylene (C$_3$) in air. The monomer is a gas at ambient temperature and pressure, so the polymerization was conducted in a high pressure reactor.

Catalyst was prepared from 260 mg Pd—A and 441 mg Ag—A in 6.49 g diethyl ether. Ether was removed, and the resulting solids were mixed with 26 g CH$_2$Cl$_2$ in air. The catalyst solution was placed in the reactor, which was then cooled to below −24° C., evacuated (so as to maximize the amount of C$_3$ that could be charged to the reactor) and filled with 150 g C$_3$. The reactor was shaken and allowed to warm at room temperature over a period of about four hours, then left for an additional 20 hours. Excess C$_3$ was vented, and 30 g of polymer was recovered from the reactor.

Sample 3, Polymer Analyses: $M_w$ 5.49×10$^5$, $M_n$ 1.54×10$^5$.

Example 4

Polymerization in the Presence of an Aqueous Phase

This example illustrates a polymerizable composition comprising alpha-olefin monomer, catalysts, and water in an amount sufficient to form a second, aqueous phase.

Catalyst was prepared from 84 mg Pd—A and 132 mg Ag—A in 5 mL diethyl ether. Ether was removed, and the resulting solids mixed with 3.66 g CH$_2$Cl$_2$ in air. 271 g deionized water, 121 g 1-octene and 1.32 g sodium heptadecyl sulfate (Tergitol 7™, Union Carbide, New York, N.Y.) were placed in a flask, and stirred with a magnetic stir bar. A milky mixture resulted. The catalyst solution was added as the mixture was stirred. Polymer could be observed within five minutes (by adding a small aliquot of the reaction mixture to methanol, which dissolved water and C$_8$, but from which polymer precipitated), and over the next 36 minutes, the temperature of the mixture rose from 23 to 25° C. due to the polymerization exotherm. Soon after, polymer (designated Sample 4) began to collect on glass surfaces in the reaction vessel. The reaction was stopped at 41 minutes, and the large agglomerates of polymer which had formed were collected by filtration, washed with methanol, and dried in vacuum. Yield: 12.4 g.

Sample 4, Polymer Analyses: $M_w$ 1.27×10$^5$, $M_n$ 7.16×10$^4$.

Similar trials were conducted with comparable amounts of water and C$_8$, but using a blender (high shear stirring) or shaking to form the two-phase mixture. Polymer again formed, but did not agglomerate, instead remaining as an organic/aqueous foam occupying about half of the volume of the reaction mixture, with a mostly aqueous phase occupying the other half.

Example 5

Polymerization in the Presence of Various Additives, and Employing Variations in Method Polymerizations were generally performed as described in the previous examples. In Samples 5-A, 5-B, and 5-C (Table 1), Pd—A and Ag—A were mixed in diethyl ether, ether was removed, solvent ($CH_2Cl_2$ unless otherwise indicated) was used to dissolve the resulting solids in air, and this solution was mixed with monomer and other additives, as indicated. Samples 5-D, 5-E, and 5-I employed one part catalyst Pd-B, dissolved in $CH_2Cl_2$ and added to monomer. Sample 5-F also employed a one-part catalyst dissolved in $CH_2Cl_2$ except that a second, aqueous phase, was present.

Samples 5-G and 5-H were prepared in a manner similar to 5-D, using a one-part catalyst and, instead of solvent, vigorous mixing, with phosphite additives added after polymerization had occurred. A temperature "r.t." indicates room temperature (about 23° C.).

TABLE 1

| Sample | Pd-A, mg | Pd-B, mg | Ag-A, mg | Solvent | Monomer (g) | rxn temp °C. | Other |
|---|---|---|---|---|---|---|---|
| 5-A | 11 | 0 | 18 | 1.33 g | $C_8$, 4.67 | r.t. | |
| 5B | 11 | 0 | 18 | 1.33 g | $C_8$, 4.52 | r.t. | Irganox 1010, 42 mg |
| 5-C | 198 | 0 | 358 | 6.53 g | $C_6$, 176 | r.t. | |
| 5-D | 0 | 500 | 0 | 100 g | $C_8$, 100 | 0 | |
| 5-E | 0 | 500 | 0 | 100 g | $C_6$, 100 | 0 | |
| 5-F | 0 | 250 | 0 | 2.5 g | $C_6$, 50 | 10 | $H_2O$, 150 g Tergitol 7, 1.00 g |
| 5-G | 0 | 5 | 0 | 0 g | $C_{10}$, 5.0 | r.t. | $P(OMe)_3$, 0.4g |
| 5-H | 0 | 8 | 0 | 0 g | $C_{10}$, 5.0 | r.t. | W618F* 0.2 g |
| 5-I | 0 | 100 | 0 | 1.47 g | $C_8$, 39 | r.t. | acetic acid, 3 g |

*W618F is Weston 618F (distearylpenterythritol diphosphite)

Observations were made as follows:

Sample 5-B contained Irganox 1010™ (Ciba Geigy Corp., Ardsley, N.Y.), a hindered-phenol-type stabilizer throughout the polymerization. This sample was compared to 5-A, and no significant differences in polymerization rate were observed. Polymer yields at about 2 days were 62% for 5-A and 63% for 5-B.

Sample 5-C, Polymer Analyses: $M_w$ 1.04×10$^5$, $M_n$ 4.23×10$^4$.

Sample 5-D, Polymer Analyses: $M_w$ 3.27×10$^5$, $M_n$ 1.76×10$^5$.

Sample 5-E, Polymer Analyses: $M_w$ 2.37×10$^5$, $M_n$ 1.50×10$^4$.

NMR analyses of Samples 5-D and 5-E were conducted. Integration of the $^1$H spectra showed only 69 and 54%, respectively, of the number of $CH_3$ groups that would be expected if there were one $CH_3$ group per monomer unit in the polymer.

High polymer was formed in Samples 5-C, 5-D, and 5-E. $M_w$ was not obtained for Samples 5-A and 5-B.

For Sample 5-F, $C_6$ and Tergitol 7 surfactant (sodium heptadecyl sulfate, Union Carbide) were mixed, catalyst was added to this, and then water was immediately added. Weight yield of polymer was 31% at 1 hour 35 minutes reaction time. $M_w$ was not determined.

In Sample 5-G, $P(OMe)_3$ was added after 1.5 hours of polymerization. The yellow reaction mixture became clear and colorless, and no further polymerization occurred. In Sample 5-H, distearylpenterythritol diphosphite (Weston 618F™, GE Specialty Chemicals, Morgantown, W.Va.) was added after 20 minutes polymerization. Dissolution of this phosphite was slower than in 5-G, but a nearly colorless solution was formed and polymerization was halted. $M_w$ was not determined. In sample 5-I, acetic acid was present throughout the polymerization.

Sample 5-I, Polymer Analyses: $M_w$ 2.23×10$^5$, $M_n$ 1.19×10$^5$.

Example 6

Two-Part Catalyst

This example illustrates one method of preparing a two-part catalyst. In this variation, a neutral organometallic compound was used in combination with a cocatalyst comprising a silver salt of a non-coordinating counterion.

In multiple runs, two-part catalysts were prepared by weighing equimolar amounts of Pd—A and Ag—A into a container and adding a solvent, typically an ether such as diethyl ether or THF. This was performed either under inert atmosphere to prevent adsorption of water by the silver salt (which might result in inaccuracies in weighing), or in air. Within minutes, the color of the mixture changed, and a precipitate (presumably AgCl) formed. The solution could be handled in air and added to monomer at this point, or ether or THF solvent (which affect polymerization rates) could be substantially removed to yield a yellow-brown solid which could be suspended in monomer or used in a different solvent. Variations in order of addition, stoichiometry, amounts and kinds of solvent, atmosphere (e.g., pure oxygen or air of high or low humidity) and the like are within the scope of this invention. In particular, it may be desired to mix Pd-A and Ag—A after dissolution in the monomer, or after cooling, or to add each reagent to different portions or different phases of a polymerizable composition. In particular, two-part catalysts may be preferred to control the onset of polymerization.

Example 7

Preparation and Isolation of One-Part Catalyst

In this example, a one-part catalyst was prepared by reacting the silver salt of a non-coordinating counterion with a neutral organometallic compound.

One part catalyst Pd—B was prepared from equimolar amounts of Pd—A and Ag—A, which were mixed in diethyl ether in dry, oxygen-free conditions. Filtration and removal of solvent from the filtrate yielded a small amount of red-orange catalytically active material. However, the ether-insoluble solids when extracted with $CH_2Cl_2$ gave a larger yield of yellow-orange solids, of greater catalyst activity and presumably greater purity (free of excess ether and silver chloride), and this fraction was used and is referred to as Pd-B throughout these examples.

Example 8

Preparation and Isolation of One-Part Catalyst

A solution of 12.44 g $LiN(SO_2CF_3)_2$ (HQ115™, commercially available from 3M, St. Paul, Minn.) and 7.36 g AgNO$_3$ in 350 mL deionized water was stirred with a solution of 22.13 g Pd—A in 350 mL methyl t-butyl ether. A color change was evident within minutes. The ether layer was separated from the water and solids that formed, and washed with a second portion of water, then taken to dryness in vacuo to produce 30.79 g {(2,6-diisopropylphenyl)N=C (Me)-C(Me)=N(2,6-diisopropylphenyl)PdMe(methyl t-butyl ether))}$^+$ {N(SO$_2$CF$_3$)$_2$}$^-$, 86% of theoretical yield. NMR spectroscopy confirmed the identity of this compound.

Similarly, Pd catalysts containing the following counterions were prepared:

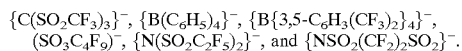
{C(SO$_2$CF$_3$)$_3$}$^-$, {B(C$_6$H$_5$)$_4$}$^-$, {B{3,5-C$_6$H$_3$(CF$_3$)$_2$}$_4$}$^-$, (SO$_3$C$_4$F$_9$)$^-$, {N(SO$_2$C$_2$F$_5$)$_2$}$^-$, and {NSO$_2$(CF$_2$)$_2$SO$_2$}$^-$.

This example shows that a neutral organometallic catalyst can be prepared without the necessity of isolating an intermediate silver salt of the counterion.

Example 9

Preparation and Isolation of One-Part Catalyst

This trial was conducted in dry solvent under an inert atmosphere. A solution of 0.214 g Pd—A and 0.304 g Li{B(C$_6$F$_5$)$_4$}(Et$_2$O)$_2$ (Example 1) in 10 mL previously-dried diethyl ether was stirred under a nitrogen atmosphere for one week, then filtered to produce a red-orange solution. Removal of solvent from the filtrate under vacuum yielded 0.365 g of {(2,6-diisopropylphenyl)N=C(Me)-C(Me)=N (2,6-diisopropylphenyl)PdMe(diethyl ether)$_n$}$^+$ {B(C$_6$F$_5$)$_4$}$^-$, where n is 1 to about 10 (depending on drying conditions), preferably about 1.

This example shows that a neutral organometallic catalyst can be prepared directly from a lithium salt of a noncoordinating anion without the need to use a silver salt. Although reaction time is longer, the method requires few steps and uses less expensive and less hazardous reagents.

Example 10

Preparation, Isolation, and Use of Two-Part Catalyst

A solution of 0.036 g Pd—A in 2.210 g CH$_2$Cl$_2$ was stirred with 8.032 g 1-octene. A red solution resulted. Next, 12.131 g deionized water was added, resulting in a second, aqueous phase. Finally, 112 mg Li{B(C$_6$H$_5$)$_4$}(Et$_2$O)$_2$ was added, and the reaction mixture was shaken. A milky yellow mixture resulted. Within 6 minutes the mixture was warm to the touch, indicating a polymerization exotherm, and at 7 minutes the weight yield of isolated polymer was 33% of theoretical. After 24 hours, the weight yield of isolated polymer was 59% of theoretical.

Example 11

Preparation, Isolation, and Use of Two-Part Catalyst

A mixture of 1351 g water, 900 g 1-octene, and a solution of 1.44 g Pd—A in 67 gm CH$_2$Cl$_2$ was placed into a large jar. The mixture was cooled to about 0° C., 3.23 g Li{B (C$_6$H$_5$)$_4$} (Example 1) was added, and the mixture was maintained at 0° to 4° C. with shaking. After about 18 hr, a solid plug of polymer filled the container, and the weight yield of polymer after drying in a vacuum oven at 50° C. for two days was determined to be 65%.

Examples 10 and 11 show that alpha-olefin polymerization can take place in a simple, rapid, one-pot procedure without the need to isolate the catalyst or to use relatively expensive silver salts. In this Example, a large volume of water was used as a sink for the heat of polymerization, and the reaction was carried out at a sufficiently low temperature that good polymer yield and molecular weight were achieved.

Polymer Analysis: M$_w$ 3.99×10$^5$, M$_n$ 2.24×10$^5$.

Example 12

Polymerization of Monomers to give Polymers, Employing Variations in Monomer and Catalyst In this example, catalyst was mixed with monomer and optional solvent as indicated. Polymerization was conducted at the temperature and for the time indicated. All procedures were conducted in air and with no attempt to remove water from monomer or solvent.

In these examples, one-part catalysts had the formula

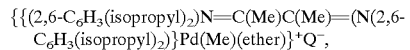
{{(2,6-C$_6$H$_3$(isopropyl)$_2$)N=C(Me)C(Me)=(N(2,6-C$_6$H$_3$(isopropyl)$_2$)}Pd(Me)(ether)}$^+$Q$^-$, wherein ether and Q are as specified in Table 2, below.

In Table 2, in the column "Rxn Cond," reactions conditions are indicated as follows: A general procedure (indicated by A through D)/reaction temperature in degrees Centigrade/reaction time in hours. Specifics of the procedures are as indicated below.

A: contained one-part catalyst, and varying amounts of liquid monomer and CH$_2$Cl$_2$ solvent. In specific procedures, the amounts by weight of monomer to CH$_2$Cl$_2$ are: A-1, 1 to 1; A-2, 3 to 1; A-4, 7.7 to 1; A-5, 1 to 2; A-6, 3.8 to 1; A-7, 5 portions of each comonomer to 1 portion of CH$_2$Cl$_2$; and A-8, 5 to 1. Reaction mixture was homogeneous initially, and polymer precipitated in some cases depending on monomer, temperature and extent of reaction. In A-3, one-part catalyst was dissolved in CH$_2$Cl$_2$ in a pressure vessel and gaseous monomer was added, but the exact amount of monomer charged was not recorded. For the samples where reaction times are shown as unknown, reaction progress was not carefully monitored and reaction times were greater than 100 hours, but not known with certainty.

B: contained one-part catalyst, 4 portions by weight of ethyl acetate, and 1 portion by weight of monomer. Reaction mixture was initially homogeneous, but polymer soon began to precipitate from solution.

C: contained two phase (monomer and water) mixture with two-part catalyst, as described in Example 11.

D: contained one-part catalyst and monomer, with no solvent. Reaction mixture formed a solution and polymer precipitated from the solution as it formed. Reaction progress was not carefully monitored and reaction times were greater than 100 hours, but not known with certainty. D* contained one-part catalyst and 1 portion by weight of each of two comonomers.

In the column "Mono/Pd" is indicated the amount of monomer in grams, divided by the amount of Pd in moles.

For the last two samples in Table 2, copolymerizations were conducted by mixing the two or more comonomers listed with one-part catalyst in the amounts indicated.

TABLE 2

| | Catalyst | | | | | Polymer Molecular Weight | | |
|---|---|---|---|---|---|---|---|---|
| Monomer | 1 or 2 | ether | Q | Rxn cond | Mono/Pd | Mw | Mn | Mw/Mn |
| C4 | one-part | Me t-BuO | $N(SO_2CF_3)_2$ | A-3/0-25/22 | (unknown) | $1.04 \times 10^5$ | $5.55 \times 10^4$ | 1.88 |
| C5 | one-part | $Et_2O$ | $B(C_6F_5)_4$ | A-1/0/68 | $2.55 \times 10^5$ | $2.40 \times 10^5$ | $8.11 \times 10^4$ | 2.95 |
| C6 | one-part | $Et_2O$ | $B(C_6F_5)_4$ | A-1/0/68 | $2.63 \times 10^5$ | $5.20 \times 10^5$ | $2.67 \times 10^5$ | 1.94 |
| C6 | one-part | Me t-BuO | $N(SO_2CF_3)_2$ | A-1/0/18 | $4.01 \times 10^5$ | $1.35 \times 10^5$ | $4.44 \times 10^4$ | 3.04 |
| C6 | one-part | Me t-BuO | $N(SO_2CF_3)_2$ | B/0-4/68 | $4.16 \times 10^5$ | $3.49 \times 10^5$ | $8.23 \times 10^4$ | 4.23 |
| C8 | one-part | $Et_2O$ | $B(C_6F_5)_4$ | A-1/0/66 | $2.62 \times 10^5$ | $6.64 \times 10^5$ | $3.05 \times 10^5$ | 2.17 |
| C8 | one-part | Me t-BuO | $N(SO_2CF_3)_2$ | B/0-4/90 | $6.07 \times 10^5$ | $6.78 \times 10^5$ | $1.30 \times 10^5$ | 5.21 |
| C8 | one-part | Me t-BuO | $N(SO_2CF_3)_2$ | A-1/10/23 | $1.57 \times 10^5$ | $3.55 \times 10^5$ | $1.21 \times 10^5$ | 2.94 |
| C8 | two-part | (none) | $B(C_6F_5)_4$ | C/0-4/18 | $3.51 \times 10^5$ | $3.99 \times 10^5$ | $2.24 \times 10^5$ | 1.78 |
| C8 | one-part | $Et_2O$ | $SbF_6$ | A-1/0/68 | $8.97 \times 10^4$ | $1.16 \times 10^5$ | $8.66 \times 10^4$ | 1.34 |
| C8 | one-part | $Et_2O$ | $N(SO_2C_4F_9)_2$ | A-2/0/68 | $2.86 \times 10^5$ | $1.06 \times 10^5$ | $1.67 \times 10^5$ | 6.32 |
| C8 | one-part | $Et_2O$ | $C(SO_2CF_3)_3$ | A-1/0/68 | $1.01 \times 10^5$ | $1.47 \times 10^5$ | $1.00 \times 10^5$ | 1.47 |
| C10 | one-part | $Et_2O$ | $B(C_6F_5)_4$ | A-1/0/68 | $2.70 \times 10^5$ | $6.76 \times 10^5$ | $1.92 \times 10^5$ | 3.53 |
| C10 | one-part | Me t-BuO | $N(SO_2CF_3)_2$ | B/0-4/68 | $4.26 \times 10^5$ | $5.48 \times 10^5$ | $1.63 \times 10^5$ | 3.36 |
| C12 | one-part | $Et_2O$ | $B(C_6F_5)_4$ | A-1/0/70 | $2.62 \times 10^5$ | $6.89 \times 10^5$ | $2.43 \times 10^5$ | 2.82 |
| C12 | one-part | Me t-BuO | $N(SO_2CF_3)_2$ | A-1/0/68 | $4.01 \times 10^5$ | $4.84 \times 10^5$ | $1.93 \times 10^5$ | 2.51 |
| C18 | one-part | $Et_2O$ | $B(C_6F_5)_4$ | A-1/23/(unknown) | $1.76 \times 10^5$ | $3.36 \times 10^5$ | $1.30 \times 10^5$ | 2.58 |
| C20 | one-part | $Et_2O$ | $B(C_6F_5)_4$ | A-4/23/(unknown) | $4.40 \times 10^5$ | $1.00 \times 10^6$ | $3.91 \times 10^5$ | 2.57 |
| cyclopentene | one-part | $Et_2O$ | $B(C_6F_5)_4$ | D/0 to 23/unknown | $8.84 \times 10^5$ | $2.02 \times 10^5$ | $1.08 \times 10^5$ | 1.87 |
| cyclopentene | one-part | $Et_2O$ | $B(C_6F_5)_4$ | A-5/23/24 | $9.17 \times 10^4$ | $1.01 \times 10^5$ | $4.50 \times 10^4$ | 2.48 |
| C7 | one-part | $Et_2O$ | $B(C_6F_5)_4$ | A-8/23/unknown | $2.78 \times 10^5$ | $9.06 \times 10^4$ | $5.98 \times 10^4$ | 1.52 |
| C9 | one-part | $Et_2O$ | $B(C_6F_5)_4$ | A/6/23/unknown | $2.56 \times 10^5$ | $1.12 \times 10^5$ | $6.99 \times 10^4$ | 1.60 |
| C11 | one-part | $Et_2O$ | $B(C_6F_5)_4$ | A/6/23/unknown | $2.56 \times 10^5$ | $4.01 \times 10^5$ | $1.68 \times 10^5$ | 2.39 |
| C13 | one-part | $Et_2O$ | $B(C_6F_5)_4$ | A/6/23/unknown | $2.56 \times 10^5$ | $1.17 \times 10^5$ | $7.87 \times 10^4$ | 1.48 |
| C14 | one-part | $Et_2O$ | $B(C_6F_5)_4$ | A/6/23/unknown | $2.56 \times 10^5$ | $2.23 \times 10^5$ | $1.30 \times 10^5$ | 1.71 |
| C15 | one-part | $Et_2O$ | $B(C_6F_5)_4$ | A/6/23/unknown | $2.56 \times 10^5$ | $9.86 \times 10^4$ | $5.64 \times 10^4$ | 1.75 |
| C16 | one-part | $Et_2O$ | $B(C_6F_5)_4$ | A/6/23/unknown | $2.56 \times 10^5$ | $2.67 \times 10^5$ | $1.36 \times 10^4$ | 1.96 |
| C17 | one-part | $Et_2O$ | $B(C_6F_5)_4$ | A/6/23/unknown | $2.56 \times 10^5$ | $1.46 \times 10^5$ | $8.60 \times 10^4$ | 1.89 |
| C19 | one-part | $Et_2O$ | $B(C_6F_5)_4$ | A/6/23/unknown | $2.56 \times 10^5$ | $7.96 \times 10^5$ | $2.81 \times 10^5$ | 2.84 |
| C6, cyclopentene | one-part | $Et_2O$ | $B(C_6F_5)_4$ | D*/23/unknown | $8.53 \times 10^5$ | $1.05 \times 10^5$ | $5.79 \times 10^4$ | 1.81 |
| C6, C8, C10, C12 | one-part | $Et_2O$ | $B(C_6F_5)_4$ | A-7/23/48 | $2.18 \times 10^5$ | $4.00 \times 10^5$ | $1.36 \times 10^5$ | 2.93 |

Example 13

Post-Polymerization Crosslinking by E-Beam Irradiation

Solutions of polyhexene and polyoctene prepared according to the invention (Samples 13A, 13B, and 13C) as well as polyhexene and polyoctene prepared by means of known Ziegler-Natta polymerization methods (Comparative Samples 13D, 13E, and 13F) were coated onto a polymeric liner and subjected to electron beam irradiation, as shown in Table 3.

Samples in solvent were coated at the weight shown onto 0.025 mm poly(ethyleneterephthalate) liner, the solvent was removed by brief air drying followed by drying in an oven at 93° C. for about 5 min. The dried samples were exposed to 175 kV electron beam irradiation on a moving web at 7.62 m/min. In Table 3, "Gel Fraction" refers to the amount, by weight percent, of polymer that was insoluble in toluene after irradiation.

TABLE 3

| | | | Wt % | Coating Weight, | Mol. Wt × $10^{-5}$ | | Gel Fraction at Dose (MRad) | | |
|---|---|---|---|---|---|---|---|---|---|
| Sample | Monomer | Solvent | solids | g/cm² × $10^{-4}$ | $M_n$ | $M_w$ | 0 | 5 | 10 |
| 13A | C8 | Toluene | 25 | 41.4 | 1.76 | 3.27 | 4.3 | 77.8 | 90.4 |
| 13B | C8 | Xylene | 16.7 | 27.2 | 2.89 | 7.02 | 5.3 | 79.6 | 88.7 |
| 13C | C6 | Toluene | 25 | 41.0 | 1.50 | 2.37 | 2.2 | 62.1 | 82.5 |

TABLE 3-continued

| Sample | Monomer | Solvent | Wt % solids | Coating Weight, g/cm² × 10⁻⁴ | Mol. Wt × 10⁻⁵ $M_n$ | Mol. Wt × 10⁻⁵ $M_w$ | Gel Fraction at Dose (MRad) 0 | Gel Fraction at Dose (MRad) 5 | Gel Fraction at Dose (MRad) 10 |
|---|---|---|---|---|---|---|---|---|---|
| 13D[a] (Comp) | C8 | Hexane | 26 | 38.9 | c | c | 3.0 | 30.1 | 49.9 |
| 13E[b] (Comp) | C8 | Hexane | 20 | 30.5 | 2.66 | 14.7 | 3.1 | 45.4 | 57.9 |
| 13F[b] (Comp) | C6 | Toluene | 25 | 43.9 | NA | 7.35[d] | 4.4 | 2.9 | 2.6 |

[a]Prepared as described in U.S. Pat. No. 5,298,708, "Polymers A"
[b]Sample obtained from Eastman Chemical Co., Kingsport, TN
[c]Not available; Inherent Viscosity = 2.67
[d]Extrapolated from Inherent Viscosity The data in Table 3 show that polyhexene and polyoctene prepared according to the invention was readily crosslinked by moderate doses of electron beam irradiation, whereas the polyhexene and polyoctene obtained by standard Ziegler-Natta polymerization could not be effectively crosslinked under similar conditions. Polymers that could be crosslinked after coating, casting, molding or extruding can show significant advantages in, e.g., wearability, solvent resistance, creep resistance, weatherability, tensile strength, etc., over similar non-crosslinked polymers.

Example 14

Post-Polymerization Crosslinking by UV Irradiation

Polyhexene was prepared by adding 100.0 gm of 1-hexene (cooled to 0° C.) to 0.50 g of {{(2,6-diisopropyl-$C_6H_3$)N=C(Me)C(Me)=N(2,6-diisopropyl-$C_6H_3$)}Pd (Me)($Et_2O$)}⁺{B($C_6F_5$)₄}⁻ (Example 9) in 100.0 g $CH_2Cl_2$ at 0° C. The reaction was kept at 0 °C. for about 42 hr. Volatiles were removed in a vacuum oven. The polymer produced had $M_n$=1.50×10⁵, $M_w$ 2.37×10⁵ (by gel permeation chromatography, as compared to polystyrene standards) Polyoctene was prepared in an identical manner, to give a polymer with $M_n$=1.76×10⁵, $M_w$ 3.27×10⁵.

The polymers were dissolved in toluene (25% polymer by weight), 2-(4-methoxyphenyl)-4,6-bis(trichloromethyl)-1,3, 5-triazine (the preparation of which is described in German Patent No. 1,200,314), was added in the amount of 0.15% by weight of polymer, and the solutions were coated onto 1 mil (0.025 mm) polyester film and dried as described in Example 10 to give a dry film coating weight of 40.13×10⁴ g/cm² (9.6±0.2 grains per 24 square inches). The films were irradiated under nitrogen with two medium pressure mercury lamps (high intensity, 200 watt/2.54 cm) made by Aetek International, Division of GEO, Plainfield, Ill. Calibration for the UV energy indicated in Table 4 is according to MIL-STD-45662A (0 means the sample was not irradiated). Gel fractions, which are the percent by weight of polymer that is insoluble in toluene, measure the amount of crosslinked polymer that was formed. The data is shown in Table 4, below.

TABLE 4

| Polymer | UV Energy, mJ/cm² | % Gel |
|---|---|---|
| Polyoctene | 0 | 0 |
| Polyoctene | 306 | 63.6 |
| Polyoctene | 614 | 70.8 |

TABLE 4-continued

| Polymer | UV Energy, mJ/cm² | % Gel |
|---|---|---|
| Polyhexene | 0 | 0 |
| Polyhexene | 306 | 51.7 |
| Polyhexene | 614 | 64.9 |

The data presented in Table 4 indicate that crosslinking of alpha-olefin polymers of the invention was accomplished upon ultraviolet irradiation of the polymer in the presence of a crosslinking additive.

Example 15

Preparation of a molded article.

Polyoctene was prepared according to the procedure of Example 12, $M_w$=3.15×10⁵, $M_n$=1.39×10⁵. 4.83 g of this polymer was placed in a 10 mL round-bottom flask. The polymer and glass container (which was used in this example as a mold) were heated to 70° C. The polymer melted and flowed to fill the bottom of the container. Additional portions of polymer were added over a total time of 80 minutes, over a temperature range of 70° to 90° C. The polymer sample was cooled, and removed from the mold by breaking the glass to give a sphere of polymer of diameter 2.7 cm, weight 11.43 g (including a small neck). This sphere bounced when dropped onto the floor.

Another sphere was prepared in a similar manner from polydodecene, $M_w$=4.84×10⁵, $M_n$=1.93×10⁵, using 9.42 g of polymer heated to 120° C. over a period of 2.5 hours. Again, removal from the mold yielded a sphere of diameter 2.7 cm, which bounced when dropped onto the floor.

Example 16

Varying Non-coordinating Counterions

This example shows the use of one-part catalysts with varying non-coordinating counterions.

In each of the samples shown in Table 5, one-part catalyst {(2,6-$C_6H_3$(isopropyl)₂)N=C($CH_3$)C($CH_3$)=N(2,6-$C_6H_3$ (isopropyl)₂)Pd(Me)(ether)}⁺Q⁻ wherein ether and Q are as specified in Table 5, was employed. The catalyst was mixed in the amount specified with 10 g $CH_2Cl_2$ and 10 g 1-octene. Mixing and polymerization occurred at 0° C. No attempt was made to remove or exclude water or air. Reaction progress was monitored by removing an aliquot from each sample at the times indicated, and drying each aliquot to determine the amount of non-volatile polymer present, from which the weight yield of polymer at that time was calculated. The molecular weight of the polymers formed after 24 hr of reaction time was measured.

TABLE 5

| Sample | Q | ether | mmol catalyst | Weight Yield (%) at time | | | Polymer Molecular Weight | | |
|---|---|---|---|---|---|---|---|---|---|
| | | | | 2 hr | 4 hr | 24 hr | Mw | Mn | Mw/Mn |
| 16A | $N(SO_2CF_3)_2$ | Me t-Bu ether | 0.064 | 11 | 24 | 81 | $1.98 \times 10^5$ | $6.00 \times 10^4$ | 3.3 |
| 16B | $B(C_6F_5)_4$ | $Et_2O$ | 0.067 | 12 | 31 | 89 | $4.59 \times 10^5$ | $1.00 \times 10^5$ | 4.59 |
| 16C | $B(3,5-C_6H_3(CF_3)_2)_4$ | $Et_2O$ | 0.064 | 14 | 29 | 90 | $4.87 \times 10^5$ | $7.49 \times 10^4$ | 6.51 |

Reaction rates for all three samples were nearly identical. However, the polymer molecular weight data showed that polymer of broader polydispersity, that is, greater ratio $M_w/M_n$ was formed in sample 16C. Narrow polymer polydispersities are generally preferred.

In another set of trials, the samples were repeated in what was believed to be an identical manner, but a different lot of catalyst was used for the catalyst wherein Q was $B(3,5-C_6H_3(CF_3)_2)_4$. In these trials, the catalyst containing counterion $B(3,5-C_6H_3(CF_3)_2)_4$ produced polymer at a significantly lower rate (about one-half that of the other two samples) and yielded polymer of lower $M_w$ and $M_n$ and greater $M_w/M_n$ ratio than the other two samples. In these trials, the different lot of catalyst wherein Q was $B(3,5-C_6H_3(CF_3)_2)_4$ was suspected to contain low levels of impurities which had proved difficult to remove.

In all of these trials, it was observed that catalysts wherein Q is $N(SO_2CF_3)$ or $B(C_6F_5)_4$ provided better control of polymerization outcomes such as polymer molecular weight distribution than catalyst wherein Q is $B(3,5-C_6H_3(CF_3)_2)_4$ in polymerizable compositions of this invention, that is, in the presence of water and air.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymerizable composition consisting essentially of:
   a) one or more hydrocarbon monomers selected from the group consisting of (1) an alpha-olefin, (2) ethylene, and (3) cyclopentene, optionally, further one or more comonomers selected from the group consisting of alkyl acrylates and methacrylates, and acrylic and methacrylic acids and salts thereof,
   b) one or both of water and air, and
   c) an effective amount of an organometallic catalyst comprising a bisimine palladium or nickel complex having bulky substituents on the imine nitrogen, which substituents have steric bulk sufficient to permit formation of high polymer, which high polymer has a multiplicity of alpha-olefin, ethylene, or cyclopentene repeat units.

2. The polymerizable composition according to claim 1 wherein said complex is a palladium complex.

3. The polymerizable composition according to claim 1 wherein said hydrocarbon monomer comprises one or more monomers selected from the group consisting of 1-octene, 1-pentene, 1-hexene, 1-decene, 1-dodecene, 1-tetradecene, 1-hexadecene, 1-octadecene, 1-eicosene, and cyclopentene.

4. The polymerizable composition according to claim 1 further comprising one or both of a stabilizer and a surfactant.

5. The polymerizable composition according to claim 4 wherein said stabilizer is a hindered phenol stabilizer.

6. The polymerizable composition according to claim 1 wherein air is present.

7. The polymerizable composition according to claim 1 wherein water is present in the range of 0.001 to 99 weight percent of the total composition.

8. The polymerizable composition according to claim 1 wherein said catalyst is a one-part catalyst comprising an organometallic salt or a two-part catalyst comprising a neutral organometallic compound and a cocatalyst.

9. The polymerizable composition according to claim 8 wherein said one-part catalyst comprises a cationic portion having the formula $LM-R^+$ wherein M is Pd or Ni, L is a two-electron donor ligand or ligands stabilizing the Pd or Ni metal, and R is H, a hydrocarbyl radical or a substituted hydrocarbyl radical wherein the substituting groups comprise one or more of alkyl having 1 to 10 carbon atoms, aryl having 5 to 20 carbon atoms, or halogen substituted alkyl groups.

10. The polymerizable composition according to claim 9 wherein M is Pd.

11. The polymerizable composition according to claim 8 wherein said one-part catalyst comprises an anionic counterion selected from the group consisting of $(R_fSO_2)_2CH^-$, $(R_fSO_2)_3C^-$, $(R_fSO_2)_2N^-$, $R_fSO_3^-$, $B(C_6F_5)_4^-$, $PF_6^-$, $SbF_6^-$, $AsF_6^-$, $BF_4^-$, and $B(3,5-C_6H_3(CF_3)_2)_4^-$, wherein each $R_f$ is independently selected from the group consisting of highly fluorinated or perfluorinated alkyl groups having 1 to 20 carbon atoms, and fluorinated aryl groups having 6 to 22 ring carbon atoms.

12. The polymerizable composition according to claim 8 wherein said one-part catalyst has the formula $$\{(ArN=C(R^1)C(R^1)=NAr)Pd(Me)(ether)\}^+ Q^-$$

wherein Ar is $2,6-C_6H_3(R^3)_2$ wherein $R^3$ is isopropyl or methyl, and each $R^1$ independently is H or methyl, or the two $R^1$ groups taken together are 1,8-naphthalene-diyl, ether is tetrahydrofuran or methyl t-butyl ether, Me is methyl, and Q is selected from the group consisting of $B(C_6F_5)_4$, $PF_6$, $SbF_6$, $AsF_6$, $BF_4$, $B(3,5-C_6H_3(CF_3))_4$, $(R_fS_2)_2CH$, $(R_fSO_2)_3C$, $(R_f SO_2)_2N$, and $R_fSO_3$, wherein $R_f$ is independently selected from the group consisting of highly fluorinated or perfluorinated alkyl groups having 1 to 20 carbon atoms, and fluorinated aryl groups having 6 to 22 ring carbon atoms.

13. The polymerizable composition according to claim 8 wherein said one-part catalyst is $\{(ArN=C(R^1)C(R^1)=NAr)M(CH_3)(OEt_2)\}^+B(C_6F_5)_4^-$ wherein M=Ni or Pd, Et=ethyl, Ar is $2,6-C_6H_3(R^3)_2$ where each $R^3$ independently is isopropyl or methyl, and each $R^1$ independently is H or methyl, or the two $R^1$ groups taken together are 1,8-naphthalene-diyl.

14. The polymerizable composition according to claim 13 wherein M is Pd.

15. The polymerizable composition according to claim 8 wherein said catalyst is a two-part catalyst and the neutral organometallic compound of said two-part catalyst has the formula $$\{ArN=C(R^1)C(R^1)=NAr\}M(R)X$$

wherein M is Pd or Ni, Ar is 2,6-$C_6H_3(R^3)_2$ where each $R^3$ independently is isopropyl or methyl, and each $R^1$ independently is H or methyl, or the two $R^1$ groups taken together are 1,8-naphthalene-diyl, R is H or a hyrocarbyl radical or a substituted hydrocarbyl radical, and X is a halogen atom.

16. The polymerizable composition according to claim 15 wherein M is Pd.

17. The polymerizable composition according to claim 8 wherein said cocatalyst of said two-part catalyst has the formula $$A^+Q^-$$

wherein A is a metal selected from the group consisting of silver, and Group IA metals, and Q is selected from the group consisting of $B(C_6H_3(CF_3)_2)_4$, $B(C_6F_5)_4$, $PF_6$, $SbF_6$, $AsF_6$, $BF_4$, $(R_fSO_2)_2CH$, $(R_fSO_2)_3C$, $(R_fSO_2)_2N$, and $R_fSO_3$, wherein $R_f$ is independently selected from the group consisting of highly fluorinated and perfluorinated alkyl groups having 1 to 20 carbon atoms, or fluorinated aryl groups having 6 to 22 ring carbon atoms.

18. The polymerizable composition according to claim 15 wherein R is methyl.

19. The polymerizable composition according to claim 1 wherein said metal of said organometallic catalyst is both Pd and Ni.

20. A composition of matter comprising a compound having the formula $$\{(ArN=C(R^1)C(R^1)=NAr)Pd(Me)(ether)\}^+Q^- \quad \text{XIII}$$

wherein Ar is 2,6-$C_6H_3(R^3)_2$ wherein each $R^3$ independently is isopropyl or methyl, and each $R^1$ independently is H or methyl, or the two $R^1$ groups taken together are 1,8-napthalene-diyl, ether is diethyl ether, tetrahydrofuran, diethyl ether, or methyl t-butyl ether, and Q is selected from the group consisting of $B(C_6F_5)_4$, $PF_6$, $SbF_6$, $AsF_6$, $BF_4$, $(R_fSO_2)_2CH$, $(R_fSO_2)_3C$, $(R_fSO_2)_2N$, and $R_fSO_3$, wherein $R_f$ is independently selected from the group consisting of highly fluorinated or perfluorinated alkyl groups having 1 to 20 carbon atoms, and fluorinated aryl groups having 6 to 22 ring carbon atoms.

21. The composition according to claim 20 wherein compounds of formula XIII are selected from the group consisting of $$\{((2,6-C_6H_3(i-Pr)_2)N=C(CH_3)C(CH_3)=N(2,6-C_6H_3(i-Pr)_2))Pd(CH_3)Me\text{ t-butyl ether}\}^+\{B(C_6F_5)_4\}^-,$$

$$\{((2,6-C_6H_3(i-Pr)_2)N=C(CH_3)C(CH_3)=N(2,6-C_6H_3(i-Pr)_2))-Pd(CH_3)(Et_2O)\}^+\{B(C_6F_5)_4\}^-,$$

$$\{((2,6-C_6H_3(i-Pr)_2)N=C(CH_3)C(CH_3)=N(2,6-C_6H_3(i-Pr)_2))Pd(CH_3)(Me\text{ t-butyl ether})\}^+\{N(SO_2CF_3)_2\}^-,$$

$$\{((2,6-C_6H_3(i-Pr)_2)N=C(CH_3)C(CH_3)=N(2,6-C_6H_3(i-Pr)_2))Pd(CH_3)\text{-}(Et_2O)\}^+\{N(SO_2CF_3)_2\}^-,$$

$$\{((2,6-C_6H_3(i-Pr)_2)N=C(CH_3)C(CH_3)=N(2,6-C_6H_3(i-Pr)_2))Pd(CH_3)(Me\text{ t-butyl ether})\}^+\{N(SO_2C_2F_5)_2\}^-,$$

and $$\{((2,6-C_6H_3(i-Pr)_2)N=C(CH_3)C(CH_3)=N(2,6-C_6H_3(i-Pr)_2))Pd(CH_3)\text{-}(Et_2O)\}^+\{N(SO_2C_2F_5)_2\}^-.$$

22. A process consisting essentially of the step of admixing one or more hydrocarbon monomers selected from the group consisting of (1) an alpha-olefin, (2) ethylene, and (3) cyclopentene, optionally a copolymerizable monomer selected from the group consisting of alkyl acrylates and methacrylates, and acrylic and methacrylic acids and salts thereof, with an organometallic catalyst comprising a bisimine palladium or nickel complex having a bulky substituent on the imine nitrogen, said substituent comprising a polydentate ligand and having steric bulk sufficient to permit formation of high polymer, in the presence of one or both of air and water to provide a polymerized or copolymerized alpha-olefin, ethylene, cyclopentene, or mixtures thereof.

23. The process according to claim 22 wherein the metal in said organometallic catalyst is Pd.

24. The process according to claim 22 further comprising the step of crosslinking the resulting polymer.

25. The process according to claim 24 wherein said crosslinking step is effected by one or more of electron beam irradiation, ultraviolet irradiation, and optionally UV-activated crosslinking agents.

26. The process according to claim 22 wherein said catalyst is a one-part catalyst comprising an organometallic salt or a two-pail catalyst comprising a neutral organometallic compound and a cocatalyst.

27. The process according to claim 22 wherein said alpha-olefin monomer comprises one or more monomers selected from the group consisting of 1-octene, 1-pentene, 1-hexene, 1-decene, 1-dodecene, 1-tetradecene, 1-hexadecene, 1-octadecene, and 1-eicosene.

28. The process according to claim 22 wherein said admixture further comprises one or both of a stabilizer and a surfactant.

29. The process according to claim 22 wherein said water is present in sufficient quantity to provide a second phase.

30. A process for preparing a one-part or two-part organometallic catalyst in the presence of at least one of air and water comprising the step of admixing a neutral organometallic compound of the formula $$\{(Ar)N=C(R^1)C(R^1)=N(Ar)\}Pd(CH_3)(halogen)$$

wherein Ar is 2,6-$C_6H_3(R^3)_2$ wherein each $R^3$ independently is isopropyl or methyl, and each $R^1$ independently is H or methyl, or the two $R^1$ groups taken together are 1,8-napthalene-diyl, and a salt of a non-coordinating counterion of the formula $A^+Q^-$ wherein A is a metal selected from the group consisting of silver, and Group IA metals, and Q is selected from the group consisting of $B(C_6H_3(CF_3)_2)_4$, $B(C_6F_5)_4$, $PF_6$, $SbF_6$, $AsF_6$, $BF_4$, $(R_fSO_2)_2CH$, $(R_fSO_2)_3C$, $(R_fSO_2)_2N$, and $R_fSO_3$, wherein $R_f$ is independently selected from the group consisting of highly fluorinated or perfluorinated alkyl groups having 1 to 20 carbon atoms, and fluorinated aryl groups having 6 to 22 ring carbon atoms.

31. The process according to claim 30 wherein said admixture further comprises one or more water, air, diethyl ether, tetrahydrofuran, methyl t-butyl ether, and hydrocarbon monomer selected from the group consisting of (1) an alpha-olefin, (2) ethylene, and (3) cyclopentene.

32. A process according to claim 30 wherein A is silver.

33. A process according to claim 30 wherein A is a Group IA metal, and wherein said admixture further comprises $AgNO_3$, water and one or more components selected from the group consisting of diethyl ether, tetrahydrofuran and methyl t-butyl ether.

34. A process according to claim 30 wherein A is a Group IA metal and wherein said admixture further comprises one or more components selected from the group consisting of diethyl ether, tetrahydrofuran and methyl t-butyl ether.

35. A process according to claim 30 wherein A is a Group IA metal and water is present in an amount sufficient to form a second phase.

\* \* \* \* \*

UNITED STATES PATENT AND TRADEMARK OFFICE
CERTIFICATE OF CORRECTION

PATENT NO. : 5,942,461
DATED : August 24, 1999
INVENTOR(S) : Katherine A. Brown, Edward G. Stewart, Penelope J. Swanson, William M. Lamanna, and Allen R. Siedle It is certified that error appears in the above-identified patent and that said Letters Patent is hereby corrected as shown below:

Column 2,
Line 42; "Emnsting" should read -- Ernsting --

Column 12,
Line 13; "((2,6-$C_6H_3$(Me)$_2$)N" should read --"{((2,6-$C_6H_3$(Me)$_2$)N --
Line 38; "(Et$_2$)}$^+$" should read -- (Et$_2$O)}$^+$ --
Line 49; "{PE$_6$-," should read -- {PE$_6$}-, --
Line 55, "((2,6-$C_6H_3$(iPr)$_2$)N" should read -- "{((2,6-$C_6H_3$(iPr)$_2$)N --

Column 13,
Line 2; "} {" should read -- } + { --
Line 40; ") Pd)Me)CI, wherein" should read -- )Pd(Me)CI, wherein --
Line 52, "))Pd(Me)CI," should read -- )Pd(Me)CI, --
Line 64, "))Ni(Me)CI," should read -- )Ni(Me)CI, --

Column 14,
Line 25; "Na$^+${(B" should read -- Na$^+${B --
Line 28; "{(N(SO$_2$C$_4$F$_9$)$_2$}$_2$-, Li$^+${NS$_2$(CF$_2$)$_2$}$^-$, -- should read -- "{N(SO$_2$C$_4$F$_9$)$_2$}$^-$, Li$^+${NSO$_2$(CF$_2$)$_2$SO$_2$}$^-$, --

Column 18,
Line 62, "{—CH$_3$(CH$_2$)$_{(n-3)}$—}" should read --{CH$_3$(CH$_2$)$_{(n-3)}$--} --

Column 21,
Line 49; "0.92 g 2A nmolecular Na" should read -- 0.92 g Na --
Line 51; "sieves" should read -- 4A molecular sieves--

UNITED STATES PATENT AND TRADEMARK OFFICE
CERTIFICATE OF CORRECTION

PATENT NO. : 5,942,461
DATED : August 24, 1999
INVENTOR(S) : Katherine A. Brown, Edward G. Stewart, Penelope J. Swanson, William M. Lamanna, and Allen R. Siedle It is certified that error appears in the above-identified patent and that said Letters Patent is hereby corrected as shown below:

Column 25,
Line 8; "t-butyl ether))}" should read -- t-butyl ether)} --

Column 27 and 28;
In Table 2, Monomer C10, Catalyst one-part Me t-BuO, Mono/Pd "$4.26 \times 10^5$" should read -- $4.16 \times 10^5$ --

Column 29,
Line 50; "(9.6±0.2" should read -- (9.6+/-0.2 --

Column 32,
Line 55; "$(CF_3)_4, (R_fS_2)_2CH$," should read -- "$(CF_3)_2)_4, (R_fS_2)_2CH$," --

Column 33,
Line 55; ")Me" should read -- )(Me --

Column 34,
Line 28; "two-pail" should read -- two-part --

Signed and Sealed this

Twenty-sixth Day of June, 2001

*Attest:*

*Attesting Officer*

NICHOLAS P. GODICI
*Acting Director of the United States Patent and Trademark Office*